United States Patent
Gou et al.

(10) Patent No.: US 10,601,619 B2
(45) Date of Patent: Mar. 24, 2020

(54) METHOD AND DEVICE FOR PROCESSING UNAUTHORIZED CARRIER

(71) Applicant: ZTE Corporation, Shenzhen (CN)

(72) Inventors: Wei Gou, Shenzhen (CN); Yajun Zhao, Shenzhen (CN); Focai Peng, Shenzhen (CN); Feng Bi, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/573,927

(22) PCT Filed: May 10, 2016

(86) PCT No.: PCT/CN2016/081611
§ 371 (c)(1),
(2) Date: Nov. 14, 2017

(87) PCT Pub. No.: WO2016/184331
PCT Pub. Date: Nov. 24, 2016

(65) Prior Publication Data
US 2018/0295004 A1  Oct. 11, 2018

(30) Foreign Application Priority Data

May 15, 2015  (CN) .......................... 2015 1 0250353
May 6, 2016   (CN) .......................... 2016 1 0300375

(51) Int. Cl.
*H04L 27/26*  (2006.01)
*H04W 74/08*  (2009.01)
(Continued)

(52) U.S. Cl.
CPC ....... *H04L 27/2605* (2013.01); *H04W 72/044* (2013.01); *H04W 72/121* (2013.01); *H04W 74/0808* (2013.01)

(58) Field of Classification Search
CPC .............................. H04L 5/0041; H04W 16/14
See application file for complete search history.

(56) References Cited

U.S. PATENT DOCUMENTS

| 2011/0128895 A1* | 6/2011 | Sadek | H04W 16/14 370/280 |
| 2013/0143502 A1* | 6/2013 | Kazmi | H04W 88/06 455/62 |
| 2015/0085797 A1* | 3/2015 | Ji | H04J 3/16 370/329 |

FOREIGN PATENT DOCUMENTS

| CN | 102648646 A | 8/2012 |
| CN | 104486013 A | 4/2015 |

(Continued)

OTHER PUBLICATIONS

Arunabha Ghosh, Jeffrey G. Andrews, Rias Muhamed, Jun Zhang. Chapter: "Designing a Broadband Wireless Network: Overview and Channel Structure of LTE." Book, "Fundamentals of LTE ." Sep. 21, 2010. Sections 6.4-6.4.4. http://www.informit.com/articles/article.aspx?p=1627062&seqNum=4 (Year: 2010).*

(Continued)

*Primary Examiner* — Ross Varndell
(74) *Attorney, Agent, or Firm* — Cantor Colburn LLP

(57) ABSTRACT

An unlicensed carrier processing method and apparatus are provided. In the method, a site implements a Clear Channel Assessment (CCA) and/or evolved CCA (eCCA); and the site occupies an unlicensed carrier based on a predetermined granularity, and/or occupies an unlicensed carrier based on a declared time length.

25 Claims, 4 Drawing Sheets

A site implements a CCA and/or eCCA — S102

The site occupies the unlicensed carrier based on a predetermined granularity, and/or occupies an unlicensed carrier based on a declared time length — S104

(51) Int. Cl.
*H04W 72/04* (2009.01)
*H04W 72/12* (2009.01)

(56) References Cited

FOREIGN PATENT DOCUMENTS

| | | |
|---|---|---|
| CN | 104540230 A | 4/2015 |
| WO | 2015050719 A2 | 4/2015 |

OTHER PUBLICATIONS

International Search Report for corresponding application PCT/CN2016/081611 filed on May 10, 2016; dated Jul. 21, 2016.
European Search Report for corresponding application EP16795818; dated Apr. 11, 2018.

* cited by examiner

METHOD AND DEVICE FOR PROCESSING UNAUTHORIZED CARRIER

TECHNICAL FIELD

The disclosure relates to, but is not limited to, the field of communications, and in particular to an unlicensed carrier processing method and apparatus.

BACKGROUND

So far, Long-Term Evolution (LTE) operates based on deployment in a licensed carrier. Along with the evolution of LTE, some enterprises (e.g. Qualcomm from America) have put forward a subject of proposals on the deployment of LTE in unlicensed carriers in the second half of 2013. However, this subject has not been accepted or approved by LTE yet.

In the view of Qualcomm, the reason why this subject should be approved is mainly as follows. As data services are increasing sharply, a licensed spectrum will not be capable of bearing such a great quantity of data before long. Thus, Qualcomm suggests deploying LTE in unlicensed carriers to offload the traffic in licensed carriers using an unlicensed spectrum.

Additionally, unlicensed spectrum has many advantages. For example, unlicensed spectrum has the following features and advantages:

free/cheap (the expenditure on spectrum resources is zero because it is not needed to buy an unlicensed spectrum);

low access requirement and low cost (apart from individuals and enterprises, devices of manufactures can participate in deploying an unlicensed spectrum);

sharable resources (in a case where a plurality of different systems operate in an unlicensed spectrum or different operators of the same system operate in an unlicensed spectrum, some resource sharing methods may be used to improve spectrum efficiency);

multiple wireless access technologies (multiple wireless access technologies may follow different communication standards, making it difficult to realize their cooperation and generating various network topologies);

many wireless access sites (a great number of users, difficult cooperation and high cost on centralized management); and many applications (it is revealed by data that a plurality of services, for example, Machine-to-Machine (M2M) and Vehicle-to-Vehicle (V2V)), can operate in an unlicensed spectrum).

The foregoing features enables unlicensed carrier to become a potential important evolution direction of wireless communication systems, however, unlicensed carrier also has many problems. For example, various wireless systems may exist in an unlicensed carrier, it may be difficult to coordinate these wireless systems, and moreover, the interference among these wireless systems may be serious.

In a case where an LTE system operates in an unlicensed carrier, when an LTE base station occupies resources of an unlicensed carrier, how to perfectly coordinate an occupation time length and subframe scheduling of LTE to avoid resource waste should be settled, and how to set an occupation time length more reasonably under constraints of a contention backoff mechanism suitable for LTE should also be settled.

No effective solutions have been proposed to address the problem that occupation of an unlicensed carrier is not properly achieved.

SUMMARY

Below is the summary of the subject matter described in detail in the disclosure. The summary is not provided to limit the protection scope of appended claims.

An unlicensed carrier processing method and apparatus are provided herein, which may realize occupation of an unlicensed carrier.

In accordance with an embodiment of the disclosure, an unlicensed carrier processing method is provided, including the following acts. A site may implement a Clear Channel Assessment (CCA) and/or an evolved CCA. The site may occupy an unlicensed carrier based on a predetermined granularity, and/or occupy an unlicensed carrier based on a declared time length.

In an exemplary embodiment, the site may occupy the unlicensed carrier based on the predetermined granularity in at least one of the following ways. The site may occupy the unlicensed carrier by using subframe as granularity. The site may occupy the unlicensed carrier by using scheduling unit as granularity. The scheduling unit may include at least one of: a time slot of Long Term Evolution (LTE), and one or more Orthogonal Frequency Division Multiplexing (OFDM) symbols.

In an exemplary embodiment, the method may further include the following act. When the site occupies the unlicensed carrier, the site may determine a time length of the unlicensed carrier which the site needs to occupy.

In an exemplary embodiment, the act that the site determines the time length of the unlicensed carrier which the site needs to occupy may include at least one of the following acts.

If a last subframe among subframes in the time length of the unlicensed carrier is an incomplete subframe, the site may determine to delete or may determine not to use the last subframe in the time length of the unlicensed carrier.

All subframes, except a first subframe which is allowed to be an incomplete subframe, in the time length of the unlicensed carrier may be complete subframes.

If a last scheduling unit among scheduling units in the time length of the unlicensed carrier is an incomplete scheduling unit, the site may determine to delete or may determine not to use the last scheduling unit in the time length of the unlicensed carrier.

All scheduling units, except a first scheduling unit which is allowed to be an incomplete scheduling unit, in the time length of the unlicensed carrier may be complete scheduling units.

In an exemplary embodiment, the act that the site determines the time length of the unlicensed carrier which the site needs to occupy may include at least one of the following acts.

In a case where a last subframe among subframes in the time length of the unlicensed carrier is an incomplete subframe, if a total time length of the last subframe is included in the time length of the unlicensed carrier, and the time length of the unlicensed carrier is not beyond a maximum time length specified in a regulation or protocol, then the site may determine to occupy and use the time length of all the subframes including the total time length of the last subframe.

In a case where a last scheduling unit among scheduling units in the time length of the unlicensed carrier is an incomplete subframe, if a total time length of the last scheduling unit is included in the time length of the unlicensed carrier, and the time length of the unlicensed carrier is not beyond a maximum time length specified in a regulation or protocol, then the site may determine to occupy and use a time length of all the scheduling units including the total time length of the last scheduling unit.

In an exemplary embodiment, if the declared time length includes at least one of: a time quantity, a fixed time length and a preconfigured time length, the declared time length may include: one or more subframes or scheduling units corresponding to an actual occupation time length.

In the exemplary embodiment, the actual occupation time length may be obtained by subtracting an actual occupation time length of a first subframe or a first scheduling unit of the declared time length from the declared time length to obtain a remaining occupation time length and then rounding up or down a quotient obtained by dividing the remaining occupation time length by a time length of one subframe or one scheduling unit.

In an exemplary embodiment, the method may further include at least one of the following acts.

When the site occupies the unlicensed carrier, the site may have a priority in using the unlicensed carrier.

When the site occupies the unlicensed carrier, the site may be able to authorize another site to use the unlicensed carrier, and another site desiring to use the unlicensed carrier may implement CCA and/or eCCA in the time length of the occupied unlicensed carrier so as to gain a right to use the unlicensed carrier.

In the exemplary embodiment, the CCA and/or eCCA implemented by the other site in the time length of the occupied unlicensed carrier are/is a high-priority CCA and/or eCCA with a pre-emption possibility higher than a pre-emption possibility for the CCA and/or eCCA implemented by the site for preempting the unlicensed carrier.

In an exemplary embodiment, time length parameters of the time length of the unlicensed carrier which the site needs to occupy may include at least one of:

subframes which the site occupies successively from a subframe in which the CCA and/or eCCA are/is implemented successfully, where the subframe in which the CCA and/or eCCA are/is implemented successfully is or is not included in the time length of the unlicensed carrier;

scheduling units which the site occupies successively from a scheduling unit in which CCA and/or eCCA are/is implemented successfully, where the scheduling unit in which the CCA and/or eCCA are/is implemented successfully is or is not included in the time length of the unlicensed carrier;

OFDM symbols which the site occupies from an OFDM symbol in which CCA and/or eCCA are/is implemented successfully;

rest subframes which the site determines to occupy relative to a current subframe;

rest scheduling units which the site determines to occupy relative to a current scheduling unit;

rest OFDM symbols which the site determines to occupy relative to a current OFDM symbol;

a subframe number of a last subframe in the time length of the unlicensed carrier, which the site determines to occupy, relative to a current subframe; and a serial number of a last scheduling unit in the time length of the unlicensed carrier, which the site determines to occupy, relative to a current scheduling unit.

In an exemplary embodiment, the method may further include at least one of the following acts.

In a case where the time length parameters include subframes which the site occupies successively from a subframe in which the CCA and/or eCCA are/is implemented successfully, the time length parameters may further include OFDM symbols occupied in a last subframe of the successively occupied subframes.

In a case where the time length parameters include scheduling units which the site occupies successively from a scheduling unit in which CCA and/or eCCA are/is implemented successfully, the time length parameters may further include OFDM symbols occupied in a last scheduled unit of the successively occupied scheduling unit.

In a case where the time length parameters include rest subframes which the site determines to occupy relative to a current subframe, the time length parameters may further include OFDM symbols occupied in a last subframe of the rest subframes which the site needs to occupy.

In a case where the time length parameters include rest scheduling units which the site determines to occupy relative to a current scheduling unit, the time length parameters may further include OFDM symbols occupied in a last scheduling unit of the rest scheduling units which the site needs to occupy.

In a case where the time length parameters include a subframe number of a last subframe in the time length of the unlicensed carrier, which the site determines to occupy, relative to a current subframe, the time length parameters may further include: OFDM symbols occupied in the last subframe.

In a case where a serial number of a last scheduling unit in the time length of the unlicensed carrier, which the site determines to occupy, relative to a current scheduling unit, the time length parameters may further include: OFDM symbols occupied in the last scheduling unit.

In an exemplary embodiment, the act that the site implements the CCA and/or eCCA may include the following act. The site may implement the CCA and/or eCCA in former preset number of OFDM symbols in a subframe for implementing the CCA and/or eCCA.

In an exemplary embodiment, when the site determines to delete or determines not to use the last subframe in the time length of the unlicensed carrier, and/or when the site determines to delete or determines not to use the last scheduling unit in the time length of the unlicensed carrier, implementing the CCA and/or eCCA may include at least one of the following acts.

The site or another site may implement the CCA and/or eCCA in the last subframe and/or the last scheduling unit.

The site authorized by the site may implement the CCA and/or eCCA in the last subframe and/or the last scheduling unit.

In an exemplary embodiment, the method may further include the following act.

When the site determines to delete or determines not to use the last subframe in the time length of the unlicensed carrier, and/or when the site determines to delete or determines not to use the last scheduling unit in the time length of the unlicensed carrier, the site may reject to send data using the last subframe and/or the last scheduling unit.

In an exemplary embodiment, the method may further include the following act. In a case where the subframe and/or the scheduling unit in which the CCA and/or eCCA are/is successfully implemented are/is included in the time length, the subframe and/or scheduling unit in which the CCA and/or eCCA are/is successfully implemented may be wholly counted in the time length of the unlicensed carrier as one subframe and/or scheduling unit; and/or a part of the subframe and/or scheduling unit in which the CCA and/or eCCA are/is successfully implemented, starting from a moment at which the CCA and/or eCCA are/is successfully implemented and ending till an end of the subframe and/or scheduling unit, may be counted in the time length of the unlicensed carrier In an exemplary embodiment, an end point of the time length of the unlicensed carrier is an end border moment of a predetermined subframe and/or scheduling unit.

In an exemplary embodiment, the method may further include the following acts.

When the site occupies the unlicensed carrier, the site may permit another site to use resources on the unlicensed carrier by multiplexing, or permit another site to use resources on the unlicensed resource exclusively. The multiplexing may include at least one of: frequency division multiplexing, time division multiplexing, spatial division multiplexing and code division multiplexing. When the other site uses the resources on the unlicensed carrier by multiplexing, the other site may need to implement CCA and/or eCCA first and then use the resources by multiplexing after implementing the CCA and/or eCCA successfully.

The act that the other site implements the CCA and/or eCCA may include that: the other site may implement the CCA and/or eCCA according to a specified frequency resource pattern which includes at least one of: specified Physical Resource Blocks (PRBs), specified Resource Elements (REs), and specified sub-carriers.

In an exemplary embodiment, acquisition of the one or more subframes or scheduling units corresponding to the obtained actual occupation time length may include at least one of the following operations.

If the actual occupation time length obtained after the quotient is rounded up is not beyond a maximum time length specified in a regulation or protocol, then the site may determine the declared time length through a rounding up operation.

If the actual occupation time length obtained after the quotient is rounded up is beyond a maximum time length specified in a regulation or protocol, then the site may determine the declared time length through a rounding down operation.

In an exemplary embodiment, the time quantity may include: a numerical value which represents the time length of the unlicensed carrier and which is included by the site in a signaling describing an occupation time length of the unlicensed carrier, where the numerical value is a time quantity taking time unit as dimension.

In an exemplary embodiment, the fixed time length may include a declared time length specified in a regulation and/or protocol for the site to occupy an unlicensed carrier each time.

In an exemplary embodiment, the preconfigured time length may include a semi-statically configured time length and/or a dynamically configured time length.

In an exemplary embodiment, the right obtained by the other site for using the unlicensed carrier may be effective in a period the site occupies the unlicensed carrier.

The right being effective in the period the site occupies the unlicensed carrier may include the following cases:

the right may be effective in one or more subframes in the time length of the unlicensed carrier occupied by the site; or the right may be effective in one or more scheduling units in the time length of the unlicensed carrier occupied by the site.

In an exemplary embodiment, the method may further include the following act. When the site occupies the unlicensed carrier and subframes and/or scheduling units not used by the site are occupied by the other site, if the site needs to use the subframes and/or scheduling units, the site may directly use the subframes and/or scheduling units without implementing the CCA and/or eCCA.

In an exemplary embodiment, the method may further include the following acts. After the site occupies the unlicensed carrier based on the predetermined granularity, and/or occupies the unlicensed carrier based on the declared time length, the site may notify the other sites of an occupation time length signaling including an occupied time length of the unlicensed carrier.

In an exemplary embodiment, the site may notify the other sites of the occupation time length signaling in at least one of the following ways.

The site may send the occupation time length signaling using a subframe in which the CCA and/or eCCA are/is implemented successfully.

The site may send the occupation time length signaling using a scheduling unit in which the CCA and/or eCCA are/is implemented successfully.

The site may send the occupation time length signaling using, as specified in advance, a subframe following a subframe in which the CCA and/or eCCA are/is implemented successfully.

The site may send the occupation time length signaling using, as specified in advance, a scheduling unit following a scheduling unit in which the CCA and/or eCCA are/is implemented successfully.

The site may send the occupation time length signaling using each subframe included in the time length of the unlicensed carrier.

The site may send the occupation time length signaling using each scheduling unit included in the time length of the unlicensed carrier.

In an exemplary embodiment, the act that the site sends the occupation time length signaling using each subframe included in the time length of the unlicensed carrier may include that:

the site may send the occupation time length signaling at a specified resource position in each subframe with assistance of a (Radio Network Temporary Identity (RNTI).

In an exemplary embodiment, the method may further include the following act. After the site implements the CCA and/or eCCA, the site may determine at least one of the following frequency domain resources:

frequency domain resources of a Physical Resource Block (PRB) without signal energy; frequency domain resources of a Resource Element (RE) without signal energy; and frequency domain resources of a sub-carrier without signal energy.

In an exemplary embodiment, the method may further include the following act.

After the frequency domain resources are determined, attributes of the site occupying the unlicensed carrier may be determined according to a pattern of the frequency domain resources without signal energy. The attributes of the site may include at least one of: information of an operator to which the site belongs, and information on whether or not the site supports frequency reusing and/or multiplexing.

In an exemplary embodiment, the method may further include the following act.

After the site implements the CCA and/or eCCA, the site may determine at least one of the following frequency domain resources:

frequency domain resources of a PRB with signal energy; frequency domain resources of an RE with signal energy; and frequency domain resources of a sub-carrier with signal energy.

In an exemplary embodiment, the method may further include the following act.

After the frequency domain resources are determined, attributes of the site occupying the unlicensed carrier may be determined according to a pattern of the frequency domain resources with signal energy. The attributes of the site may include at least one of: information of an operator to which the site belongs, and information on whether or not the site supports frequency reusing and/or multiplexing.

In accordance with another embodiment of the disclosure, an unlicensed carrier processing apparatus applied to a site is provided. The apparatus may include an implementation module and an occupation module. The implementation module may be configured to implement CCA and/or eCCA. The occupation module may be configured to occupy an unlicensed carrier based on a predetermined granularity, and/or occupy an unlicensed carrier based on a declared time length.

In an exemplary embodiment, the occupation module may be configured to:

occupy the unlicensed carrier based on the predetermined granularity by using subframe as granularity; and/or occupy the unlicensed carrier based on the predetermined granularity by using scheduling unit as granularity, where the scheduling unit may include at least one of: a time slot of LTE, and one or more OFDM symbols; and/or occupy an unlicensed carrier based on a declared time length.

In accordance with still another embodiment of the disclosure, an unlicensed carrier processing method is provided. The method may include the following acts.

A site may implement CCA and/or eCCA.

The site may occupy an unlicensed carrier based on a predetermined granularity, and/or occupy an unlicensed carrier based on a declared time length.

The site may configure a signaling according to a time length of the unlicensed carrier which the site occupies and may send the signaling.

The signaling may include: description on OFDM symbols occupied in a last subframe in the time length of the unlicensed carrier which the site occupies.

In an exemplary embodiment, the site may occupy the unlicensed carrier based on the predetermined granularity in at least one of the following ways.

The site may occupy the unlicensed carrier by using subframe as granularity.

The site may occupy the unlicensed carrier by using scheduling unit as granularity. The scheduling unit may include at least one of: a time slot of LTE, and one or more OFDM symbols.

In an exemplary embodiment, the act that the site sends the signaling may include at least one of the following acts.

The site may send the signaling using one or more subframes in the time length of the unlicensed carrier.

The site may send the signaling in each subframe included in the time length of the unlicensed carrier.

In an exemplary embodiment, the act that the site sends the signaling may include the following act.

The site may send the occupation time length signaling at a specified resource position in a subframe in the time length of the unlicensed carrier with assistance of a (Radio Network Temporary Identity (RNTI).

In an exemplary embodiment, the act that the site sends the signaling may include the following act.

The site may use a common search space of a Physical Downlink Control Channel (PDCCH) or an enhanced (PDCCH) to send the signaling in a subframe in the time length of the unlicensed carrier.

In an exemplary embodiment, the method may further include the following act. If a last subframe among subframes in the time length of the unlicensed carrier is a complete subframe, the signaling may describe occupation of all OFDM symbols of the last subframe.

In an exemplary embodiment, if subframes in the time length of the unlicensed carrier include uplink subframes and downlink subframes, subframes occupied by the site may include either or both of the downlink subframes and the uplink subframes.

In an exemplary embodiment, if a last subframe among subframes in the time length of the unlicensed carrier is an incomplete subframe, the signaling may describe OFDM symbols occupied in the last subframe.

In accordance with still another embodiment of the disclosure, an unlicensed carrier processing method is provided. The method may include the following acts.

A signaling, which is sent by a site, for indicating a time length in which an unlicensed carrier is occupied may be received and analyzed.

OFDM symbols occupied in a last subframe in the time length may be determined according to the analyzed signaling.

In the embodiment, the signaling may include: description on OFDM symbols occupied in the last subframe in the time length of the unlicensed carrier occupied by the site.

In accordance with yet still another embodiment of the disclosure, an unlicensed carrier processing apparatus applied to a site is provided, including an implementation module, a carrier occupation module and a sending module.

The implementation module may be configured to implement CCA and/or eCCA.

The carrier occupation module may be configured to occupy an unlicensed carrier based on a predetermined granularity.

The sending module may be configured to configure a signaling according to a time length of the unlicensed carrier which the site occupies and send the signaling.

In the embodiment, the signaling may include: description on OFDM symbols occupied in a last subframe in the time length of the unlicensed carrier occupied by the site.

In accordance with yet still another embodiment of the disclosure, an unlicensed carrier processing apparatus, including: a receiving module and a determination module.

The receiving module may be configured to receive and analyze a signaling, which is sent by a site, for indicating a time length in which an unlicensed carrier is occupied.

The determination module may be configured to determine OFDM symbols occupied in a last subframe in the time length according to the analyzed signaling.

In the embodiment, the signaling may include: description on OFDM symbols occupied in the last subframe in the time length of the unlicensed carrier occupied by the site.

In some embodiments of the disclosure, a site may implement CCA and/or eCCA, and the site may occupy an unlicensed carrier based on a predetermined granularity, and/or occupy an unlicensed carrier based on a declared time length, thus realizing the occupation of an unlicensed carrier.

Other aspects of the disclosure can be understood by reading and appreciating accompanying drawings and the detailed description.

DETAILED DESCRIPTION OF THE EMBODIMENTS

It should be noted that the terms 'first' and 'second', as used hereinafter, are used to distinguish among similar objects but not absolutely indicate a specific sequence or a precedence order.

Figure 1:
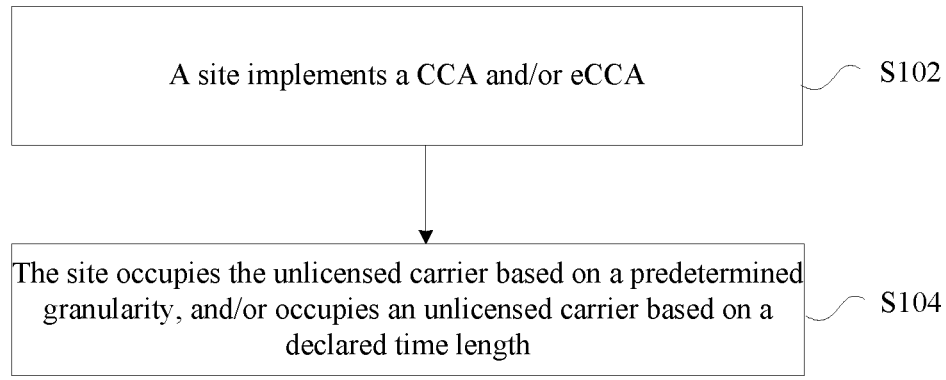
FIG. 1 is a flowchart illustrating an unlicensed carrier processing method according to an embodiment of the disclosure.

An unlicensed carrier occupation method is provided in the embodiment. FIG. 1 is a flowchart illustrating a carrier resource processing method for an unlicensed carrier according to an embodiment of the disclosure. As shown in FIG. 1, the flow may include the following acts.

At act S102, a site may implement CCA and/or eCCA.

It should be noted that the site may implement the CCA and/or eCCA so as to acquire a right to use an unlicensed carrier at act S104.

At act S104, the site may occupy an unlicensed carrier based on a predetermined granularity, and/or occupy an unlicensed carrier based on a declared time length.

It should be noted that the occupation of an unlicensed carrier based on a predetermined granularity may include the occupation of the unlicensed carrier based on the predetermined granularity. Likewise, the occupation of an unlicensed carrier with a declared time may include the occupation of an unlicensed carrier based on a declared time length.

By executing the foregoing acts of CCA and/or eCCA in which an unlicensed carrier is occupied based on the predetermined granularity and/or based on the declared time length, the occupation of an unlicensed carrier may be realized, thus addressing the problem that the occupation of an unlicensed carrier is not properly realized.

In an exemplary embodiment, the site may occupy the unlicensed carrier based on the predetermined granularity in at least one of the following ways. The site may occupy the unlicensed carrier by using subframe as granularity. The site may occupy the unlicensed carrier by using scheduling unit as granularity. The scheduling unit may include at least one of: a time slot of an LTE, and one or more Orthogonal Frequency Division Multiplexing (OFDM) symbols.

In an exemplary embodiment, when the site occupies the unlicensed carrier based on the predetermined granularity, and/or occupies an unlicensed carrier based on a declared time length, the method may further include the following act. The site may determine the time length of the unlicensed carrier which the site needs to occupy. The declared time length may be shorter than or as long as the determined time length of the unlicensed carrier which the site needs to occupy.

If a last subframe among subframes in the time length of the unlicensed carrier is an incomplete subframe, the site may determine to delete or may determine not to use the last subframe in the time length of the unlicensed carrier. That is, the site may determine not to occupy or may determine to occupy but not to use the last subframe of the unlicensed carrier. All subframes, except a first subframe which is allowed to be an incomplete subframe, in the time length of the unlicensed carrier may be complete subframes. Here, the first subframe may be a complete subframe or an incomplete subframe. If a last scheduling unit among scheduling units in the time length of the unlicensed carrier is an incomplete scheduling unit, the site may determine to delete or may determine not to use the last scheduling unit in the time length of the unlicensed carrier, that is, the site may determine not to occupy or may determine to occupy but not to use the last scheduling unit in the unlicensed carrier. All the scheduling units, except a first scheduling unit which may be an incomplete scheduling unit, in the time length of the unlicensed carrier may be complete scheduling units. Here, the first scheduling unit may be a complete scheduling unit or an incomplete scheduling unit.

In a case where a last subframe among subframes in the time length of the unlicensed carrier is an incomplete subframe, if a total time length of the last subframe is included in the time length of the unlicensed carrier, and the time length of the unlicensed carrier is not beyond a maximum time length specified in a regulation or protocol, then the site may determine to occupy and use the total time length of all subframes which includes a total time length of the last subframe. In a case where a last scheduling unit among scheduling units in the time length of the unlicensed carrier is an incomplete subframe, if a total time length of the last scheduling unit is included in the time length of the unlicensed carrier, and the time length of the unlicensed carrier is not beyond a maximum time length specified in a regulation or protocol, then the site may determine to occupy and use the total time length of all scheduling units which includes the total time length of the last scheduling unit.

In an exemplary embodiment, if the declared time length is at least one of: a time quantity, a fixed time length and a preconfigured time length, then the declared time length may include:

one or more subframes or scheduling units corresponding to an actual occupation time length. The actual occupation time length may be obtained by subtracting an actual occupation time length of a first subframe or a first scheduling unit of the declared time length from the declared time length to obtain a remaining occupation time length and then rounding up or down a quotient obtained by dividing the remaining occupation time length by a time length of one subframe or one scheduling unit.

In an exemplary embodiment, the method of the exemplary embodiment of the disclosure may further include at least one of the following acts.

When the site occupies the unlicensed carrier, the site may have a priority in using the unlicensed carrier.

When the site occupies the unlicensed carrier, the site may be able to authorize another site to use the unlicensed carrier, and another site desiring to use the unlicensed carrier may implement CCA and/or eCCA in the time length of the occupied unlicensed carrier so as to gain a right to use the unlicensed carrier.

It should be noted that the other site may be a User Equipment (UE) affiliated to the site.

The CCA and/or eCCA implemented by the other site in the time length of the occupied unlicensed carrier may be a high-priority CCA and/or eCCA with a pre-emption possibility higher than a pre-emption possibility for the CCA and/or eCCA implemented by the site for preempting the unlicensed carrier.

In an exemplary embodiment, time length parameters of the time length of the unlicensed carrier which the site needs to occupy may include at least one of: subframes which the site occupies successively from a subframe in which the CCA and/or eCCA are/is implemented successfully, where the subframe in which the CCA and/or eCCA are/is implemented successfully is or is not included in the time length of the unlicensed carrier; scheduling units which the site occupies successively from a scheduling unit in which CCA and/or eCCA are/is implemented successfully, where the scheduling unit in which the CCA and/or eCCA are/is implemented successfully is or is not included in the time length of the unlicensed carrier; the OFDM symbols the site occupies successively from the OFDM symbol in which CCA and/or eCCA are/is implemented successfully; rest subframes which the site determines to occupy relative to a current subframe; rest scheduling units which the site determines to occupy relative to a current scheduling unit; rest OFDM symbols which the site determines to occupy relative to a current OFDM symbol; a subframe number of a last subframe in the time length of the unlicensed carrier, which the site determines to occupy, relative to a current subframe; a serial number of a last scheduling unit in the time length of the unlicensed carrier, which the site determines to occupy, relative to a current scheduling unit.

In a case where the time length parameters include subframes which the site occupies successively from a subframe in which the CCA and/or eCCA are/is implemented successfully, the time length parameters may further include: OFDM symbols occupied in a last subframe of the successively occupied subframes. In a case where the time length parameters include scheduling units which the site occupies successively from a scheduling unit in which the CCA and/or eCCA are/is implemented successfully, the time length parameters may further include: OFDM symbols occupied in a last scheduled unit of the successively occupied scheduling unit. In a case where the time length parameters include rest subframes which the site determines to occupy relative to a current subframe, the time length parameters may further include: OFDM symbols occupied in a last subframe of the rest subframes which the site needs to occupy. In a case where the time length parameters include rest scheduling units which the site determines to occupy relative to a current scheduling unit, the time length parameters may further include: OFDM symbols occupied in a last scheduling unit of the rest scheduling units which the site needs to occupy. In a case where the time length parameters include a subframe number of a last subframe in the time length of the unlicensed carrier, which the site determines to occupy, relative to a current subframe, the time length parameters may further include: OFDM symbols occupied in the last subframe. In a case where a serial number of a last scheduling unit in the time length of the unlicensed carrier, which the site determines to occupy, relative to a current scheduling unit, the time length parameters may further include: OFDM symbols occupied in the last scheduling unit.

In an exemplary embodiment, the act that the site implements the CCA and/or eCCA may include the following act. The site may implement the CCA and/or eCCA in former preset number of OFDM symbols in a subframe for implementing the CCA and/or eCCA.

In an exemplary embodiment, when the site determines to delete or determines not to use the last subframe in the time length of the unlicensed carrier, and/or when the site determines to delete or determines not to use the last scheduling unit in the time length of the unlicensed carrier, the act of implementing the CCA and/or eCCA may include the following acts.

The site or another site (e.g. a UE affiliated to the site) may implement the CCA and/or eCCA in the last subframe and/or the last scheduling unit; and/or a site authorized by the site may implement the CCA and/or eCCA in the last subframe and/or the last scheduling unit.

In an exemplary embodiment, the method of the exemplary embodiment of the disclosure may further include the following act.

When the site determines to delete or determines not to use the last subframe in the time length of the unlicensed carrier, and/or when the site determines to delete or determines not to use the last scheduling unit in the time length of the unlicensed carrier, the site may reject to send data using the last subframe and/or the last scheduling unit.

In an exemplary embodiment, in a case where the subframe and/or the scheduling unit in which the CCA and/or eCCA are/is successfully implemented are/is included in the time length, the subframe and/or scheduling unit in which the CCA and/or eCCA are/is successfully implemented may be wholly counted in the time length of the unlicensed carrier as one subframe and/or scheduling unit; and/or, a part of the subframe and/or scheduling unit in which the CCA and/or eCCA are/is successfully implemented, starting from a moment at which the CCA and/or eCCA are/is successfully implemented and ending till an end of the subframe and/or scheduling unit, may be counted in the time length of the unlicensed carrier.

In an exemplary embodiment, an end point of the time length of the unlicensed carrier is an end border moment of a predetermined subframe and/or scheduling unit.

In an exemplary embodiment, the site, when occupying the unlicensed carrier, may permit another site to use resources on the unlicensed carrier by multiplexing, or may permit another site to use resources on the unlicensed resource exclusively. The multiplexing may include at least one of: frequency division multiplexing, time division multiplexing, spatial division multiplexing and code division multiplexing. When the other site uses the resources on the unlicensed carrier by multiplexing, the other site may need to implement CCA and/or eCCA first and then use the resources by multiplexing after implementing the CCA and/or eCCA successfully. The act that the other site implements the CCA and/or eCCA may include the following act. The other site may implement the CCA and/or eCCA according to a specified frequency resource pattern which includes at least one of: specified PRBs, specified REs, and specified sub-carriers.

If the unlicensed carrier is occupied based on a declared time length, the declared time length may include: one or more subframes or scheduling units corresponding to an actual occupation time length. In this exemplary embodiment, the actual occupation time length may be obtained by subtracting an actual occupation time length of a first subframe or a first scheduling unit of the declared time length from the declared time length to obtain a remaining occupation time length and then rounding up or down a quotient obtained by dividing the remaining occupation time length by a time length of one subframe or one scheduling unit. In this exemplary embodiment, if the actual occupation time length obtained after the quotient is rounded up is not beyond a maximum time length specified in a regulation and/or protocol, then the site may determine the declared time length through a rounding up operation. If the actual occupation time length obtained after the quotient is rounded up is beyond a maximum time length specified in a regulation and/or protocol, then the site may determine the declared time length through a rounding down operation.

In an exemplary embodiment, the time quantity may include a numerical value which represents the time length of the unlicensed carrier and which is included by the site in a signaling describing an occupation time length of the unlicensed carrier, and the numerical value may be a time quantity taking time unit as dimension.

The fixed time length may include a declared time length specified in a regulation and/or protocol for the site to occupy an unlicensed carrier each time.

The preconfigured time length may include a semi-statically configured time length and/or a dynamically configured time length.

In an exemplary embodiment, the right obtained by the other site for using the unlicensed carrier may be effective in a period the site occupies the unlicensed carrier.

The right being effective in the period the site occupies the unlicensed carrier may include the following cases.

The right may be effective in one or more subframes in the time length of the unlicensed carrier occupied by the site; or the right may be effective in one or more scheduling units in the time length of the unlicensed carrier occupied by the site.

In an exemplary embodiment, when the site occupies the unlicensed carrier and subframes and/or scheduling units not used by the site are occupied by the other site, if the site needs to use the subframes and/or scheduling units, the site may directly use the subframes and/or scheduling units without implementing the CCA and/or eCCA.

In an exemplary embodiment, after the site occupies the unlicensed carrier based on the predetermined granularity, and/or occupies an unlicensed carrier based on a declared time length, the method may further include the following act. The site may notify the other sites of an occupation time length signaling including an occupied time length of the unlicensed carrier.

In an exemplary embodiment, the site may notify the other sites of the occupation time length signaling in at least one of the following ways. The site may send the occupation time length signaling using a subframe in which the CCA and/or eCCA are/is implemented successfully. The site may send the occupation time length signaling using a scheduling unit in which the CCA and/or eCCA are/is implemented successfully. The site may send the occupation time length signaling using, as specified in advance, a subframe following a subframe in which the CCA and/or eCCA are/is implemented successfully. The site may send the occupation time length signaling using, as specified in advance, a scheduling unit following a scheduling unit in which the CCA and/or eCCA are/is implemented successfully. The site may send the occupation time length signaling using each subframe included in the time length of the unlicensed carrier. The site may send the occupation time length signaling using each scheduling unit included in the time length of the unlicensed carrier.

In an exemplary embodiment, the act that the site sends the occupation time length signaling using each subframe included in the time length of the unlicensed carrier may include the following act. The site may send the occupation time length signaling at a specified resource position in each subframe with assistance of a (Radio Network Temporary Identity (RNTI).

In an exemplary embodiment, after the site implements the CCA and/or eCCA, the site may determine at least one of the following frequency domain resources: frequency domain resources of a PRB without signal energy; frequency domain resources of an RE without signal energy; and frequency domain resources of a sub-carrier without signal energy.

In an exemplary embodiment, after the site determines the frequency domain resources, the method may further include the following act. Attributes of the site occupying the unlicensed carrier may be determined according to a pattern of the frequency domain resources without signal energy. The attributes of the site may include at least one of: information of an operator to which the site belongs, and information on whether or not the site supports frequency reusing and/or multiplexing.

In an exemplary embodiment, after the site implements the CCA and/or eCCA, the site may determine at least one of the following frequency domain resources: frequency domain resources of a PRB with signal energy; frequency domain resources of an RE with signal energy; frequency domain resources of a sub-carrier with signal energy.

In an exemplary embodiment, after the site determines the frequency domain resources, the method may further include the following act. Attributes of the site occupying the unlicensed carrier may be determined according to a pattern of the frequency domain resources with signal energy. The attributes of the site may include at least one of: information of an operator to which the site belongs, and information on whether or not the site supports frequency reusing and/or multiplexing.

In an exemplary embodiment, if the site needs to transmit the attributes of the site occupying the unlicensed carrier, the site may transfer the attributes of the site occupying the unlicensed carrier in a way the site implements CCA and/or eCCA detection.

By reading the description of the foregoing embodiments, those skilled in the art can clearly appreciate that the methods of the foregoing embodiments can be realized by means of software and a necessary universal hardware platform, and apparently, the methods of the foregoing embodiments may also be realized by hardware although the former realization mode may be a preferred implementation. Based on the appreciation, the technical solutions of the embodiments of the disclosure may be implemented as software products which can be stored on a memory medium (e.g. an ROM/RAM, a magnetic disk and a compact disc) and in which a plurality of instructions are contained to execute a part of or all the acts of the methods described herein on one computer device (e.g. a personal computer, a server, or a network device).

An unlicensed carrier occupying apparatus is also provided herein which is used for realizing the foregoing embodiments and optional implementation modes, and what has been described above is not repeated here. The term 'module', as used hereinafter, is the combination of software and/or hardware for realizing predetermined functions.

Although the apparatuses described in the following embodiments are preferably implemented as software, the implementation of the apparatuses as hardware or s combination of software and hardware may also be devised.

An embodiment of the disclosure provides a computer memory medium on which computer-executable instructions are stored that may be executed to realize the foregoing unlicensed carrier occupation method.

Figure 2:
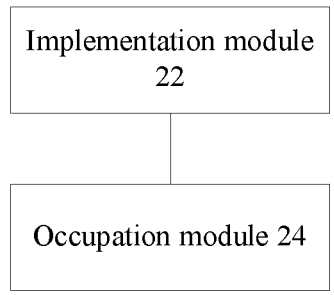
FIG. 2 is a block diagram illustrating an unlicensed carrier processing apparatus according to an embodiment of the disclosure.

FIG. 2 is a block diagram illustrating an unlicensed carrier processing apparatus according to an embodiment of the disclosure. As shown in FIG. 2, the apparatus applied to a site may include: an implementation module 22 and an occupation module 24 which are described below.

The implementation module 22 may be configured to implement CCA and/or eCCA. The occupation module 24 may be coupled with the implementation module 22 and configured to occupy an unlicensed carrier based on a predetermined granularity, and/or occupy an unlicensed carrier based on a declared time length.

In an exemplary embodiment, the occupation module may be configured to:

occupy the unlicensed carrier based on the predetermined granularity by using subframe as granularity, and/or occupy the unlicensed carrier based on the predetermined granularity by using scheduling unit as granularity, where the scheduling unit may include at least one of: a time slot of LTE, and one or more OFDM symbols; and/or occupy an unlicensed carrier based on a declared time length.

When the site occupies the unlicensed carrier based on the predetermined granularity, and/or occupies an unlicensed carrier based on a declared time length, the apparatus may be further configured to implement the following act. The site may determine the time length of the unlicensed carrier which the site needs to occupy. The declared time length may be shorter than or as long as the determined time length of the unlicensed carrier which the site needs to occupy.

If a last subframe among subframes in the time length of the unlicensed carrier is an incomplete subframe, the site may determine to delete or may determine not to use the last subframe in the time length of the unlicensed carrier. That is, the site may determine not to occupy or may determine to occupy but not to use the last subframe of the unlicensed carrier. All subframes, except a first subframe which is allowed to be an incomplete subframe, in the time length of the unlicensed carrier may be complete subframes. Here, the first subframe may be a complete subframe or an incomplete subframe. If a last scheduling unit among scheduling units in the time length of the unlicensed carrier is an incomplete scheduling unit, the site may determine to delete or may determine not to use the last scheduling unit in the time length of the unlicensed carrier. That is, the site may determine not to occupy or may determine to occupy but not to use the last scheduling unit in the unlicensed carrier. All the scheduling units, except the first scheduling unit which may be an incomplete scheduling unit, in the time length of the unlicensed carrier may be complete scheduling units. Here, the first scheduling unit may be a complete scheduling unit or an incomplete scheduling unit.

In a case where a last subframe among subframes in the time length of the unlicensed carrier is an incomplete subframe, if a total time length of the last subframe is included in the time length of the unlicensed carrier, and the time length of the unlicensed carrier is not beyond a maximum time length specified in a regulation or protocol, then the site may determine to occupy and use the total time length of all subframes which includes a total time length of the last subframe. In a case where a last scheduling unit among scheduling units in the time length of the unlicensed carrier is an incomplete subframe, if a total time length of the last scheduling unit is included in the time length of the unlicensed carrier, and the time length of the unlicensed carrier is not beyond a maximum time length specified in a regulation or protocol, then the site may determine to occupy and use the total time length of all scheduling units which includes the total time length of the last scheduling unit.

In an exemplary embodiment, if the declared time length is at least one of: a time quantity, a fixed time length and a preconfigured time length, the declared time length may include:

one or more subframes or scheduling units corresponding to an actual occupation time length. The actual occupation time length may be obtained by subtracting an actual occupation time length of a first subframe or a first scheduling unit of the declared time length from the declared time length to obtain a remaining occupation time length and then rounding up or down a quotient obtained by dividing the remaining occupation time length by a time length of one subframe or one scheduling unit.

In an exemplary embodiment, the embodiment of the disclosure may further include at least one of the following acts.

When the site occupies the unlicensed carrier, the site may have a priority in using the unlicensed carrier.

When the site occupies the unlicensed carrier, the site may be able to authorize another site to use the unlicensed carrier, and another site desiring to use the unlicensed carrier may implement CCA and/or eCCA in the time length of the occupied unlicensed carrier so as to gain a right to use the unlicensed carrier.

The CCA and/or eCCA implemented by the other site in the time length of the occupied unlicensed carrier may be a high-priority CCA and/or eCCA with a pre-emption possibility higher than a pre-emption possibility for the CCA and/or eCCA implemented by the site for preempting the unlicensed carrier.

In an exemplary embodiment, time length parameters of the time length of the unlicensed carrier which the site needs to occupy may include at least one of: subframes which the site occupies successively from a subframe in which the CCA and/or eCCA are/is implemented successfully, where the subframe in which the CCA and/or eCCA are/is implemented successfully is or is not included in the time length of the unlicensed carrier; scheduling units which the site occupies successively from a scheduling unit in which CCA and/or eCCA are/is implemented successfully, where the scheduling unit in which the CCA and/or eCCA are/is implemented successfully is or is not included in the time length of the unlicensed carrier; OFDM symbols which the site occupies from an OFDM symbol in which CCA and/or eCCA are/is implemented successfully; rest subframes which the site determines to occupy relative to a current subframe; rest scheduling units which the site determines to occupy relative to a current scheduling unit; rest OFDM symbols which the site determines to occupy relative to a current OFDM symbol; a subframe number of a last subframe in the time length of the unlicensed carrier, which the site determines to occupy, relative to a current subframe; and a serial number of a last scheduling unit in the time length of the unlicensed carrier, which the site determines to occupy, relative to a current scheduling unit.

In a case where the time length parameters include subframes which the site occupies successively from a subframe in which the CCA and/or eCCA are/is implemented successfully, the time length parameters may further include: OFDM symbols occupied in a last subframe of the successively occupied subframes. In a case where the time length parameters include scheduling units which the site occupies successively from a scheduling unit in which CCA and/or eCCA are/is implemented successfully, the time length parameters may further include: OFDM symbols occupied in a last scheduled unit of the successively occupied scheduling unit. In a case where the time length parameters include rest subframes which the site determines to occupy relative to a current subframe, the time length parameters may further include: OFDM symbols occupied in a last subframe of the rest subframes which the site needs to occupy. In a case where the time length parameters include rest scheduling units which the site determines to occupy relative to a current scheduling unit, the time length parameters may further include: OFDM symbols occupied in a last scheduling unit of the rest scheduling units which the site needs to occupy. In a case where the time length parameters include a subframe number of a last subframe in the time length of the unlicensed carrier, which the site determines to occupy, relative to a current subframe, the time length parameters may further include: OFDM symbols occupied in the last subframe. In a case where a serial number of a last scheduling unit in the time length of the unlicensed carrier, which the site determines to occupy, relative to a current scheduling unit, the time length parameters may further include: OFDM symbols occupied in the last scheduling unit.

In an exemplary embodiment, the act that the site implements CCA and/or eCCA may include that: the site may implement the CCA and/or eCCA in former preset number of OFDM symbols in a subframe for implementing the CCA and/or eCCA.

In an exemplary embodiment, when the site determines to delete or determines not to use the last subframe in the time length of the unlicensed carrier, and/or when the site determines to delete or determines not to use the last scheduling unit in the time length of the unlicensed carrier, the act of implementing the CCA and/or eCCA may include at least one of the following act.

The site or another site (e.g. a UE affiliated to the site) may implement the CCA and/or eCCA in the last subframe and/or the last scheduling unit. A site authorized by the site may implement the CCA and/or eCCA in the last subframe and/or the last scheduling unit.

In an exemplary embodiment, the apparatus may be further configured to implement the following act.

When the site determines to delete or determines not to use the last subframe in the time length of the unlicensed carrier, and/or when the site determines to delete or determines not to use the last scheduling unit in the time length of the unlicensed carrier, the site may reject to send data using the last subframe and/or the last scheduling unit.

In an exemplary embodiment, in a case where the subframe and/or the scheduling unit in which the CCA and/or eCCA are/is successfully implemented are/is included in the time length, the subframe and/or scheduling unit in which the CCA and/or eCCA are/is successfully implemented may be wholly counted in the time length of the unlicensed carrier as one subframe and/or scheduling unit; and/or a part of the subframe and/or scheduling unit in which the CCA and/or eCCA are/is successfully implemented, starting from a moment at which the CCA and/or eCCA are/is successfully implemented and ending till an end of the subframe and/or scheduling unit, may be counted in the time length of the unlicensed carrier. In an exemplary embodiment, an end point of the time length of the unlicensed carrier may be an end border moment of a predetermined subframe and/or scheduling unit.

In an exemplary embodiment, an end point of the time length of the unlicensed carrier may be an end border moment of a predetermined subframe and/or scheduling unit.

In an exemplary embodiment, the site, when occupying the unlicensed carrier, may permit another site to use resources on the unlicensed carrier by multiplexing, or may permit another site to use resources on the unlicensed resource exclusively. The multiplexing may include at least one of: frequency division multiplexing, time division multiplexing, spatial division multiplexing and code division multiplexing. When the other site uses the resources on the unlicensed carrier by multiplexing, the other site may need to implement CCA and/or eCCA first and then use the resources by multiplexing after implementing the CCA and/or eCCA successfully. The act that the other site implements the CCA and/or eCCA may include that: the other site may implement the CCA and/or eCCA according to a specified frequency resource pattern which includes at least one of: specified PRBs, specified REs, and specified subcarriers.

If the unlicensed carrier is occupied based on a declared time length, the declared time length may include: one or more subframes or scheduling units corresponding to an actual occupation time length. The actual occupation time length may be obtained by subtracting an actual occupation time length of a first subframe or a first scheduling unit of the declared time length from the declared time length to obtain a remaining occupation time length and then rounding up or down a quotient obtained by dividing the remaining occupation time length by a time length of one subframe or one scheduling unit. In an exemplary embodiment, if the actual occupation time length obtained after the quotient is rounded up is not beyond a maximum time length specified in a regulation and/or protocol, then the site may determine the declared time length through a rounding up operation. If the actual occupation time length obtained after the quotient is rounded up is beyond a maximum time length specified in a regulation and/or protocol, then the site may determine the declared time length through a rounding down operation.

The time quantity may include a numerical value which represents the time length of the unlicensed carrier and which is included by the site in a signaling describing an occupation time length of the unlicensed carrier. The numerical value may be a time quantity taking time unit as dimension.

The fixed time length may include a declared time length specified in a regulation and/or protocol for the site to occupy an unlicensed carrier each time.

The preconfigured time length may include a semi-statically configured time length and/or a dynamically configured time length.

In an exemplary embodiment, the right obtained by the other site for using the unlicensed carrier may be effective in a period the site occupies the unlicensed carrier.

The right being effective in the period the site occupies the unlicensed carrier may include the following cases.

The right may be effective in one or more subframes in the time length of the unlicensed carrier occupied by the site; or the right may be effective in one or more scheduling units in the time length of the unlicensed carrier occupied by the site.

In an exemplary embodiment, when the site occupies the unlicensed carrier and subframes and/or scheduling units not used by the site are occupied by the other site, if the site needs to use the subframes and/or scheduling units, the site may directly use the subframes and/or scheduling units without implementing the CCA and/or eCCA.

In an exemplary embodiment, after the site occupies the unlicensed carrier based on the predetermined granularity, and/or occupies an unlicensed carrier based on a declared time length, the apparatus may be further configured to execute the following act. The site may notify the other sites of an occupation time length signaling including an occupied time length of the unlicensed carrier.

In an exemplary embodiment, the site may notify the other sites of the occupation time length signaling in at least one of the following ways. The site may send the occupation time length signaling using a subframe in which the CCA and/or eCCA are/is implemented successfully. The site may send the occupation time length signaling using a scheduling unit in which the CCA and/or eCCA are/is implemented successfully. The site may send the occupation time length signaling using, as specified in advance, a subframe following a subframe in which the CCA and/or eCCA are/is implemented successfully. The site may send the occupation time length signaling using, as specified in advance, a scheduling unit following a scheduling unit in which the CCA and/or eCCA are/is implemented successfully. The site may send the occupation time length signaling using each subframe included in the time length of the unlicensed carrier. The site may send the occupation time length signaling using each scheduling unit included in the time length of the unlicensed carrier.

In an exemplary embodiment, the act that the site sends the occupation time length signaling using each subframe included in the time length of the unlicensed carrier may include that: the site may send the occupation time length signaling at a specified resource position in each subframe with assistance of an RNTI.

In an exemplary embodiment, after the site implements the CCA and/or eCCA, the site may determine at least one of the following frequency domain resources: frequency domain resources of a PRB without signal energy; frequency domain resources of an RE without signal energy; and frequency domain resources of a sub-carrier without signal energy.

In an exemplary embodiment, after the site determines the frequency domain resources without signal energy, the apparatus may be further configured to execute the following act. Attributes of the site occupying the unlicensed carrier may be determined according to a pattern of the frequency domain resources without signal energy. The attributes of the site may include at least one of: information of an operator to which the site belongs, and information on whether or not the site supports frequency reusing and/or multiplexing.

In an exemplary embodiment, after the site implements the CCA and/or eCCA, the site may further determine at least one of the following frequency domain resources: frequency domain resources of a PRB with signal energy; frequency domain resources of an RE with signal energy; frequency domain resources of a sub-carrier with signal energy.

In an exemplary embodiment, after the frequency domain resources are determined, attributes of the site occupying the unlicensed carrier may be determined according to a pattern of the frequency domain resources with signal energy. The attributes of the site may include at least one of: information of an operator to which the site belongs, and information on whether or not the site supports frequency reusing and/or multiplexing.

In an exemplary embodiment, if the site needs to transmit the attributes of the site occupying the unlicensed carrier, the site may transfer the attributes of the site occupying the unlicensed carrier in the way the site implements CCA and/or eCCA detection.

Figure 3:
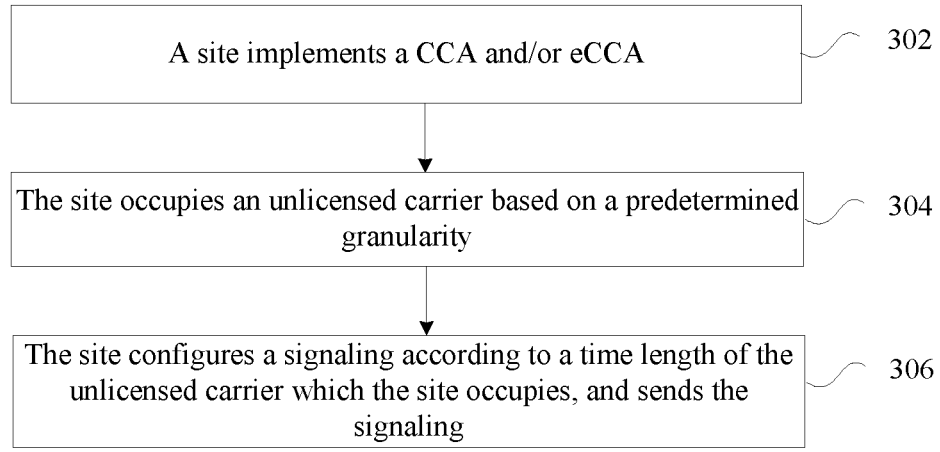
FIG. 3 is a flowchart illustrating an unlicensed carrier processing method according to another embodiment of the disclosure.

FIG. 3 is a flowchart illustrating an unlicensed carrier processing method according to another embodiment of the disclosure. As shown in FIG. 3, the method may include the following acts.

At act S302, a site may implement CCA and/or eCCA.

At act S304, the site may occupy an unlicensed carrier based on a predetermined granularity.

At act S306, the site may configure a signaling according to a time length of the unlicensed carrier which the site occupies and may send the signaling.

The signaling may include: description on OFDM symbols occupied in the last subframe in the time length of the unlicensed carrier occupied by the site.

In an exemplary embodiment, the site may occupy the unlicensed carrier based on the predetermined granularity in at least one of the following ways.

The site may occupy the unlicensed carrier by using subframe as granularity.

The site may occupy the unlicensed carrier by using scheduling unit as granularity, and the scheduling unit may include at least one of: a time slot of LTE, and one or more OFDM symbols.

In an exemplary embodiment, the act that the site sends the signaling may include at least one of the following acts.

The site may send the signaling using one or more subframes in the time length of the unlicensed carrier.

The site may send the signaling in each subframe included in the time length of the unlicensed carrier.

In an exemplary embodiment, the act that the site sends the signaling may include the following act.

The site may send the signaling at a specified resource position in a subframe in the time length of the unlicensed carrier with assistance of an RNTI.

In an exemplary embodiment, the act that the site sends the signaling may include the following act.

The site may use a common search space of a Physical Downlink Control Channel (PDCCH) or an enhanced (PDCCH) to send the signaling in a subframe in the time length of the unlicensed carrier.

The method of the embodiment may further include the following act. If a last subframe among subframes in the time length of the unlicensed carrier is a complete subframe, then the signaling may describe occupation of all OFDM symbols of the last subframe.

In an exemplary embodiment, if subframes in the time length of the unlicensed carrier include uplink subframes and downlink subframes, subframes occupied by the site may include either or both of the downlink subframes and the uplink subframes.

In an exemplary embodiment, if a last subframe among subframes in the time length of the unlicensed carrier is an incomplete subframe, then the signaling may describe the occupation of OFDM symbols occupied in the last subframe.

Figure 4:
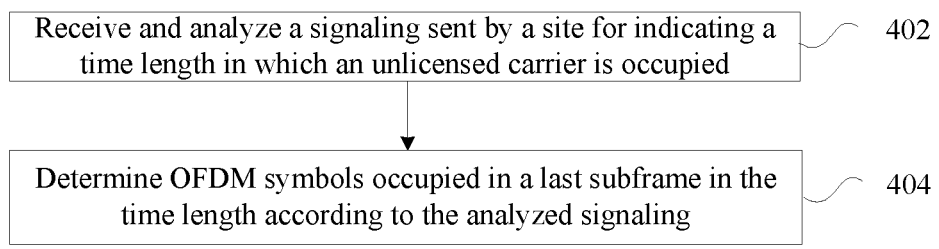
FIG. 4 is a flowchart illustrating an unlicensed carrier processing method according to still another embodiment of the disclosure.

FIG. 4 is a flowchart illustrating an unlicensed carrier processing method according to still another embodiment of the disclosure. As shown in FIG. 4, the method may include the following acts.

At act S402, a signaling, which is sent by a site, for indicating a time length in which an unlicensed carrier is occupied may be received and analyzed.

At act S404, OFDM symbols occupied in the last subframe in the time length may be determined according to the analyzed signaling.

The signaling may include: description on OFDM symbols occupied in the last subframe in the time length of the unlicensed carrier occupied by the site.

It should be noted that the method provided herein may be executed by a site different from the site sending a signaling for indicating an occupation time length of the unlicensed carrier. Herein, the site different from the site sending the signaling for indicating the occupation time length of the unlicensed carrier may be UE affiliated to the site sending the signaling for indicating the occupation time length of the unlicensed carrier.

Still another embodiment of the disclosure provides a computer memory medium on which computer-executable instructions are stored. The computer-executable instructions are executed to realize the foregoing unlicensed carrier processing method.

Figure 5:
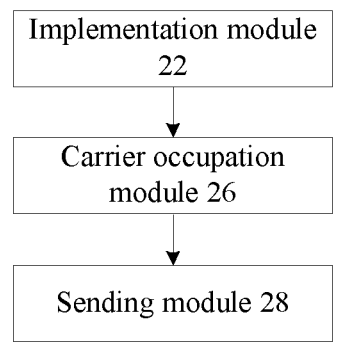
FIG. 5 is a block diagram illustrating an unlicensed carrier processing apparatus according to another embodiment of the disclosure.

FIG. 5 is a block diagram illustrating an unlicensed carrier processing apparatus according to yet still another embodiment of the disclosure. As shown in FIG. 5, the apparatus applied to a site may include: an implementation module 22, a carrier occupation module 26 and a sending module 28.

The implementation module 22 may be configured to implement CCA and/or eCCA.

The carrier occupation module 26 may be configured to occupy an unlicensed carrier based on a predetermined granularity.

The sending module 28 may be configured to configure a signaling according to a time length of the unlicensed carrier which the site occupies and send the signaling.

The signaling may include: description on OFDM symbols occupied in the last subframe in the time length of the unlicensed carrier occupied by the site.

Figure 6:
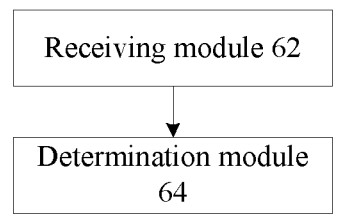
FIG. 6 is a block diagram illustrating an unlicensed carrier processing apparatus according to yet still another embodiment of the disclosure.

FIG. 6 is a block diagram illustrating an unlicensed carrier processing apparatus according to yet still another embodiment of the disclosure. As shown in FIG. 6, the apparatus may include: a receiving module 62 and a determination module 64.

The receiving module 62 may be configured to receive and analyze a signaling, which is sent by a site, for indicating a time length in which an unlicensed carrier is occupied.

The determination module 64 may be configured to determine OFDM symbols occupied in the last subframe in the time length according to the analyzed signaling.

The signaling may include: description on OFDM symbols occupied in the last subframe in the time length of the unlicensed carrier occupied by the site.

It should be noted that the apparatus provided herein may be arranged on or coupled with a site different from the site sending an occupation time length of the unlicensed carrier indication signaling. Herein, the site different from the site sending a signaling for indicating an occupation time length of the unlicensed carrier may include a UE affiliated to the site sending the signaling for indicating the occupation time length of the unlicensed carrier.

Implementation modes of the disclosure are described below in detail with reference to exemplary embodiments so as to provide a comprehensive understanding of and a reference on how the solution provided in the disclosure solves technical problems by technological means to realize a technical effect.

LTE is deployed in an unlicensed carrier and is referred to as a License Assisted Access (LAA) system in the research and evolution of LTE. In comprehensive consideration of a scheduling rule according to which LTE is based on a unit of subframe (time length: 1 ms), the disclosure defines different appropriate starting points for an occupation time length of the unlicensed carrier and, based on these starting points, provides the design of a signaling for determining an occupation time length. The solution in the disclosure makes the cooperation of given LBT designs more reasonable by defining and describing different occupation time lengths based on different starting points.

Figure 7:
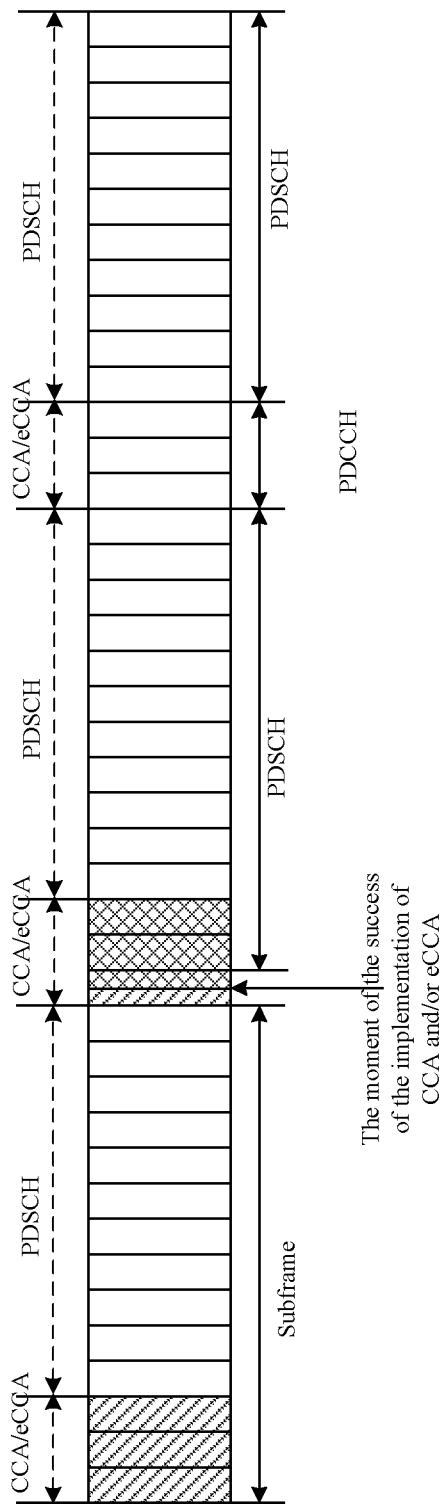
FIG. 7 is a schematic diagram illustrating an LBT design according to an embodiment of the disclosure.

FIG. 7 shows a possible Listen-Before-Talk (LBT) design for LAA. What is mainly shown in FIG. 3 is the fixation of CCA and/or eCCA (hereinafter referred to as CCA and/or eCCA) implementation position in the frame structure of LTE. In FIG. 7, the implementation of CCA and/or eCCA may only start from the starting position of a subframe and only proceeds in several preceding OFDM symbols of a subframe, no CCA and/or eCCA are/is allowed during the rest time of a subframe. Each subframe is supportive to the CCA and/or eCCA. The LBT design is easier and more realizable when compared with the frame structure and the data mapping transmission of LTE. However, the mechanism still has defects and therefore needs improving. For example, if the last subframe in an occuption time available for an LAA site is an incomplete subframe, then the site may use several preceding OFDM symbols in the occupation time length to send data. However, in the last subframe, the other LAA sites may find that the channel corresponding to the last subframe is busy and consequentially implement no CCA and/or eCCA until the next subframe arrives. In this case, the OFDM symbols not occupied and used by the LAA site are wasted, and moreover, it is highly likely that a WIFI system occupies these OFDM symbols by implementing CCA and/or eCCA.

Figure 8:
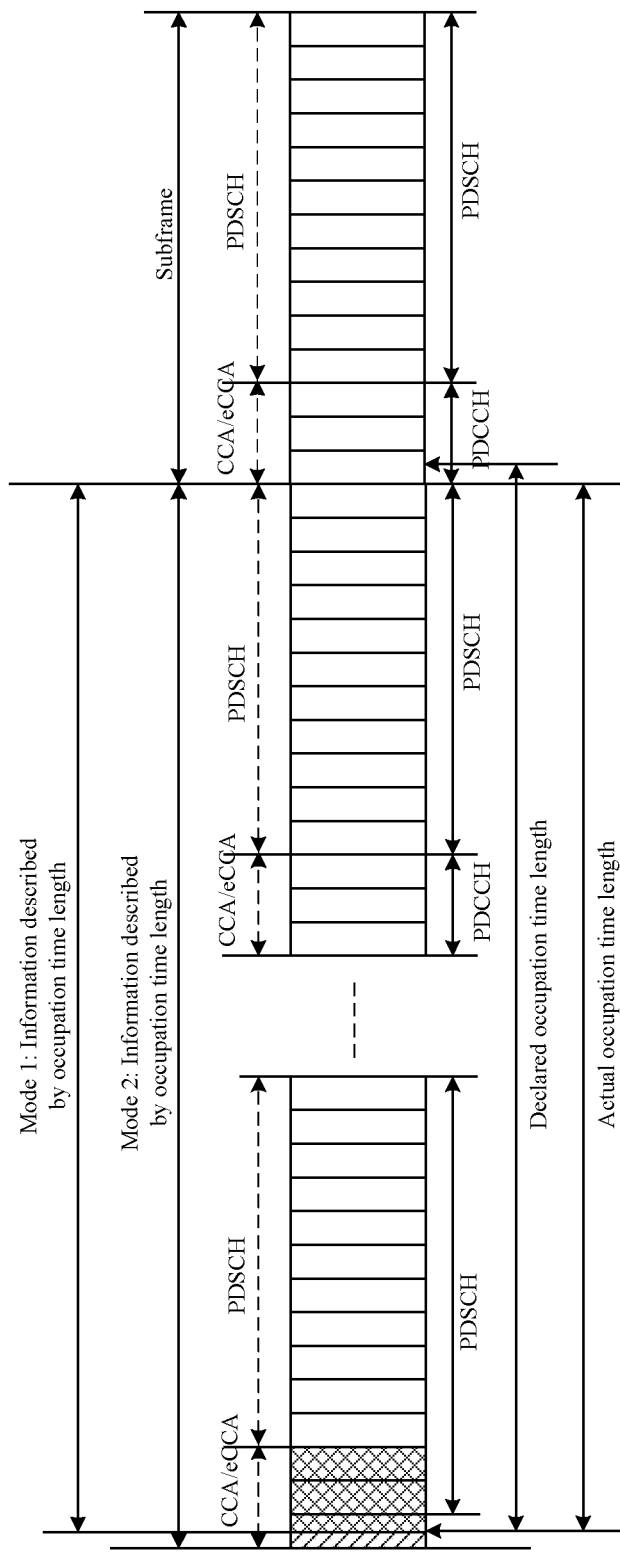
FIG. 8 is a schematic diagram illustrating an occupation time length and occupied resources according to an embodiment of the disclosure.

A method of designing an occupation time length and occupied resources is described below. The method, apart from being capable of matching with the foregoing LBT design well, is also applicable to other LBT designs. Embodiments of the method can be appreciated with reference to FIG. 8 which is a schematic diagram illustrating an occupation time length and occupied resources according to an embodiment of the disclosure. FIG. 8 shows several modes which are described below.

Mode 1:

After successfully implementing CCA and/or eCCA, a site may occupy an unlicensed carrier by using a subframe or a scheduling unit A (the subframe mentioned hereinafter may be replaced with a scheduling unit A, if not stated particularly) as granularity and then use the unlicensed carrier. If the last one of the subframes or scheduling units A in an occupation time length is an incomplete subframe or scheduling unit A (the time direction of the subframe is not wholly occupied), then it may be regulated in a protocol that the site excludes the last subframe or the last scheduling unit A from the occupation time length. Alternatively, only the first subframe or scheduling unit A in the occupation time length of the site can be an incomplete subframe or scheduling unit A, and only a plurality of complete LTE subframes or scheduling units can be occupied in the rest occupation time length of the site. It should be noted here that the plurality of complete LTE subframes or scheduling units practically refer to the subframes or scheduling units A of existing LTE and that the rest occupation time length is not the sum of the plurality of complete LTE subframes or scheduling units. For example, when the calculated needed rest time length is not equal to the time length of the plurality of subframes, the site may only round down to obtain an integral number of subframes or scheduling units A.

The site may implement CCA and/or eCCA in N preceding OFDM symbols of each subframe and may not implement CCA and/or eCCA in other time. The range of the N preceding OFDM symbols may change dynamically or semi-statically or may be adjusted by the site implementing CCA and/or eCCA according to a preset triggering condition.

If the subframes in the occupation time length of the site include uplink subframes and downlink subframes, the occupation time length of the LAA site may include either or both of the downlink subframes and the uplink subframes.

Other sites or the site can implement CCA and/or eCCA in the last subframe or scheduling unit A, that is not used by the site, so as to compete for resources. Alternatively, the site may receive data, but not send data, in the last subframe or scheduling unit A. Still alternatively, a site authorized by the site may implement CCA and/or eCCA in the last subframe or scheduling unit A.

When calculating an occupation time length, a site may need to include the total time length of the subframes or scheduling units A in which CCA and/or eCCA are/is successfully implemented in the occupation time length thereof, that is, the starting point of the subframes or scheduling units in which CCA and/or eCCA are/is successfully implemented is taken as the starting point of the occupation time length of the site. Alternatively, when calculating an occupation time length, a site may take the moment CCA and/or eCCA are/is successfully completed as the starting point of an occupation time length. Still alternatively, when calculating an occupation time length, a site may include the total time length of corresponding OFDM symbols included in a subframe in which CCA and/or eCCA are/is successfully implemented in the occupation time length thereof, that is, the starting point of the OFDM symbols in which CCA and/or eCCA are/is successfully completed may be taken as the starting point of the occupation time length of the site.

The scheduling unit A may include a time slot, or an OFDM symbol of LTE, or a combination of a plurality of symbols.

The site successfully completing CCA and/or eCCA may send an occupation time length signaling which can be designed in the following way aiming at the foregoing mode.

If the occupation time length signaling of a site describes occupation time length information as the number of subframes or scheduling units A, then it may be regulated in a protocol that the number of subframes or scheduling units A described in the signaling refers to the number of the subframes or scheduling units including the subframes or scheduling units A in which CCA and/or eCCA are/is implemented successfully; or it may be regulated in a protocol that the number of subframes or scheduling units A refers to the number of the subframes or scheduling units starting with the one following those in which CCA and/or eCCA are/is implemented successfully, i.e., the subframes or scheduling units A in which CCA and/or eCCA are/is implemented successfully are excluded. In the latter case, the site may need to guarantee that the total of the time length described by the signaling and the time length of the subframes or scheduling units A in which CCA and/or eCCA are/is implemented successfully is not beyond a maximum time regulated or stipulated in a protocol for a single occupation.

Signaling Design:

Option 1: an occupation time length signaling may include the following parameters: a parameter 1 used for describing the number of the subframes which are occupied successively and which start with the one in which CCA and/or eCCA are/is implemented successfully; and a parameter 2 used for describing how many preceding OFDM symbols of the last one of the subframes described by the parameter 1 are counted in an occupation time length. The sending of the parameter 2 is optional, for example, if each OFDM symbol in the last subframe is counted in the occupation time length, then the parameter 2 may not be sent. The subframe in which the CCA and/or eCCA are/is implemented successfully may be included in the occupation time length (apparently, the exclusion of the subframe from the occupation time length is adoptable, the processing carried out in this case is similar to that carried out in a case where the subframe in which the CCA and/or eCCA are/is implemented successfully is included in the occupation time length and is therefore not repeated here).

Option 2: an occupation time length signaling may include the following parameters: a parameter 3 used for describing the number of the scheduling units which are occupied successively and which start with the one in which CCA and/or eCCA are/is implemented successfully; and a parameter 4 used for describing how many preceding OFDM symbols of the last one of the scheduling unit A described by the parameter 1 are counted in an occupation time length. The sending of the parameter 4 is optional, for example, if each OFDM symbol in the last scheduling unit is counted in the occupation time length, then the parameter 4 may not be sent. The scheduling unit A in which CCA and/or eCCA are/is implemented successfully may be included in the occupation time length (apparently, the exclusion of the scheduling unit A from the occupation time length is adoptable, the processing carried out in this case is similar to that carried out in a case where the scheduling unit A in which CCA and/or eCCA are/is implemented successfully is included in the occupation time length and is therefore not repeated here). In this case, the scheduling unit A may be a time slot (the time slot of LTE is 0.5 ms).

Option 3: an occupation time length signaling may include the following parameters: a parameter 5 used for describing the number of the OFDM symbols which are occupied successively and which start with the one in which CCA and/or eCCA are/is implemented successfully. An OFDM symbol in which CCA and/or eCCA are/is implemented successfully may be included in the occupation time length (apparently, the exclusion of the OFDM from the occupation time length is adoptable, the processing carried out in this case is similar to that carried out in a case where the OFDM symbol in which CCA and/or eCCA are/is implemented successfully is included in the occupation time length and is therefore not repeated here).

Option 4: an occupation time length signaling may include the following parameters: a parameter 6 used for describing the number of the rest occupied subframes or scheduling units A or OFDM symbols in addition to the current subframe or scheduling unit A or OFDM symbol (in this case, the current subframe is not counted in the number described by the parameter 6; a processing carried out in a case where the current subframe is counted in the number described by the parameter 6 is similar to that carried out in a case where the current subframe is not counted in the number described by the parameter 6 and is therefore not repeated here); and a parameter 7 used for describing how many preceding OFDM symbols of the last one of the subframe or scheduling unit A described by the parameter 6 are counted in an occupation time length (the remaining OFDM symbols are not counted in the number described by the parameter 7). The sending of the parameter 7 is optional, for example, when each OFDM symbol in the last subframe is counted in the occupation time length, the parameter 7 may not be sent. The subframe in which the CCA and/or eCCA are/is implemented successfully may be included in the occupation time length (apparently, the exclusion of the subframe from the occupation time length is adoptable, the processing carried out in this case is similar to that carried out in a case where the subframe in which the CCA and/or eCCA are/is implemented successfully is included in the occupation time length and is therefore not repeated here).

Option 5: an occupation time length signaling may include the following parameters: a parameter 8 used for describing the serial number of the last one of the subframes or scheduling units A that are occupied in an occupation time length in addition to the current subframe or scheduling unit A; and a parameter 9 used for describing how many preceding OFDM symbols of the last subframe or scheduling unit A described by the parameter 8 are counted in the occupation time length. The sending of the parameter 9 is optional, for example, when each OFDM symbol in the last subframe is counted in the occupation time length, the parameter 9 may not be sent. The subframe in which the CCA and/or eCCA are/is implemented successfully may be included in the occupation time length (apparently, the exclusion of the subframe from the occupation time length is adoptable, the processing carried out in this case is similar to that carried out in a case where the subframe in which the CCA and/or eCCA are/is implemented successfully is included in the occupation time length and is therefore not repeated here). The occupied subframes may be occupied successively.

Below is description of the position of a subframe or scheduling unit in which an occupation time length signaling is sent.

An occupation time length signaling may be sent in a subframe or scheduling unit A in which CCA and/or eCCA are/is implemented, or it may be specified that an occupation time length signaling is sent in the subframe or scheduling unit A following the one in which CCA and/or eCCA are/is implemented. For options 4 and 5, an occupation time length signaling may be sent in each subframe or scheduling unit in an occupation time length so that another site missing the first subframe or preceding subframes of the occupation time length can continue to implement a receiving processing. In an exemplary embodiment, an occupation time length signaling may be sent with assistance of a common RNTI at a resource position specified in each subframe. For example, an occupation time length signaling may be sent in a common search space of a PDCCH or ePDCCH.

The site may permit, in the occupation time length, another site to use resources of the unlicensed carrier resource available in the occupation time length by multiplexing (including frequency division multiplexing, time division multiplexing, code division multiplexing and spatial division multiplexing) or permit another site to exclusively use the resources available in the occupation period.

If the occupation time length signaling of the site describes the occupation time length of the site as a time quantity, for example, N milliseconds (N is not always an integer), and the starting point of the occupation time length is defined as described above, then the site may need to calculate actually occupied subframes or scheduling units based on different starting points of occupation time length in the following way.

The time length of the subframes or scheduling units A in which CCA and/or eCCA are/is implemented successfully may be subtracted from the time quantity of the occupation time length (in practice, the subtraction is suggested to be conducted according to a specified starting point of the occupation time length), the time length obtained by the subtraction may be divided by the time length of one subframe or scheduling unit A, the quotient obtained by the division may be rounded down, and the resulting integer is taken as the number of the subframes or scheduling units A that are actually occupied.

After implementing the CCA and/or eCCA successfully, the site may occupy the unlicensed carrier by taking subframe or scheduling unit A as granularity and then use the unlicensed carrier.

The description of the occupation time length is a description of a two-layer structure. A first-level is description on the subframes occupied, and the description may be expressed in the way above. The first-level description may be expressed with not more than 4 bits. The maximum occupation time length may be different in different regions, for example, the maximum occupation time length is 10 ms or 13 ms in Europe but 4 ms in Japan. A second-level is description on the inclusion of several successive preceding OFDM symbols in the last one of the occupied subframes in the occupation time length.

Alternatively, the occupation time length may be described as a time quantity based on a unit of millisecond or microsecond, for example, a time length of 4 (or not more than 4) bits. In this case, other sites or the site may need to convert the time quantity into actually occupied subframes or scheduling units A in the way described above.

For the occupation time length sent by the site occupying the unlicensed carrier, there are two cases. Case 1: the occupation time length is converted (converted to be corresponding to a subframe border or a scheduling unit A border) by the site occupying the unlicensed carrier, and then sent as an actual occupation time length. Case 2: the occupation time length sent by the site occupying the unlicensed carrier is not converted, and in this case, another site may need to conduct the conversion. In the latter case, the other site is required to acquire the position of the symbol or subframe where the CCA and/or eCCA of the site is implemented successfully when implementing CCA and/or eCCA. The other site may acquire the position just by implementing CCA and/or eCCA detection.

After receiving the occupation time length signaling sent by the site, the other site can use resources by multiplexing in the occupation period; or instead of implementing CCA and/or eCCA detection in the occupation time length, the other site may implement CCA and/or eCCA to compete for resources after the occupation time length expires, thus saving power consumption and simplifying the design of the other site.

Mode 2:

When compared with mode 1, mode 2 is advantaged in solving the problem that the data of a site cannot be transmitted completely.

The resources of a site are decreased in mode 1 because of the conduction of a rounding-down operation. The processing performed in mode 2 is identical to that performed in mode 1 except for the increase of a round-up operation.

If the last one of the subframes or scheduling units A in the occupation time length of a site is an incomplete subframe or scheduling unit, then a total time length of the last subframe or scheduling unit A is included in the occupation time length. Moreover, if the occupation time length is not longer than a maximum occupation time length that is specified in a regulation or protocol, then the site may occupy and use a total time length of the last subframe or scheduling unit A (that is, the last subframe or scheduling unit A is wholly included in the occupation time length).

The other processing may be performed in the way a corresponding processing is performed in mode 1 or in a way similar to the way a corresponding processing is performed in mode 1, if no conflict is caused.

Mode 3:

This mode targets at a case in which an occupation time length is described as a time quantity.

If the occupation time length declared by a site after the site implements CCA and/or eCCA successfully is a time quantity or a fixed time length (e.g. each occupation time length is a fixed time length) or a configured time length, then the time actually occupied by the site may be calculated as follows. The actual occupation time length of the first subframe or scheduling unit may be subtracted from the declared time length, the resulting occupation time length may be divided by the time length of a subframe or scheduling time A, and the obtained quotient may be rounded up or down to obtain subframes or scheduling units corresponding to the actual occupation time length.

If the actual occupation time length is not longer than a maximum time length specified in a regulation or protocol after being rounded up, then the site may carry out a round-up operation. If the actual occupation time length is longer than the maximum time length specified in a regulation or protocol after being rounded up, then the site may carry out a round-down operation.

The declared occupation time length may be a fixed time length. In such a case, the time length specified in a regulation or protocol for each occupation time length of a site is a fixed time length. Alternatively, the declared occupation time length may be a configured time length. In such a case, each occupation time length of a site may be configured semi-statically or dynamically.

In the occupation time length declared by the site, the site may have a priority in transmitting or receiving data in corresponding subframes, if compared with the other sites. The other sites may have a lower priority in occupying and using corresponding subframes. If the other sites desire to use the subframes or scheduling units that are corresponding to an actually unoccupied time length which is included in the occupation time length declared by the site or the subframes or scheduling units that are corresponding to an actually occupied time length, then the other sites may first implement CCA and/or eCCA to compete for these subframes or scheduling units and then use these subframes or scheduling units after implementing the CCA and/or eCCA successfully. If the site authorizes the other sites to use these subframes or scheduling units, then the other sites may use these subframes or scheduling units without implementing CCA and/or eCCA for resource contention. If the other sites are permitted to use these subframes or scheduling units by frequency division multiplexing, then the other sites may only need to implement CCA and/or eCCA in a frequency band planned for frequency division multiplexing. If the other sites are permitted to reuse frequency, then the other sites may not need to implement CCA and/or eCCA for resource contention.

The other processing may be performed in the way a corresponding processing is performed in mode 1 or in a way similar to the way a corresponding processing is performed in mode 1, if no conflict is caused.

Mode 4:

During the occupation time length declared by the site after the site implements CCA and/or eCCA successfully, the site may have a priority in using the unlicensed carrier, or the site may authorize another site to use the unlicensed carrier. By implementing CCA and/or eCCA in the declared occupation time length, another site may acquire a right to use the unlicensed carrier and use the unlicensed carrier after acquiring the right.

In a case where the other site uses the unlicensed carrier after acquiring the right, the right acquired by the other site may be only effective in the declared occupation time length.

In a case where the other site uses the unlicensed carrier after acquiring the right, the right acquired by the other site may be only effective in one subframe or scheduling unit.

During the occupation time length declared by the site, the site may directly use the subframes or scheduling units that are not used by the site and therefore used by another site, without implementing CCA and/or eCCA.

The site may permit another site to use the unlicensed carrier by frequency division multiplexing or time division multiplexing in the occupation time length declared by the site. In the case of frequency division multiplexing, the other site may first implement CCA and/or eCCA in the multiplexed frequency resource and may multiplex the unlicensed carrier after implementing the CCA and/or eCCA successfully.

The other processing may be performed in the way a corresponding processing is performed in mode 1, 2 or 3 or in a way similar to the way a corresponding processing is performed in mode 1, 2 or 3, if no conflict is caused.

The modes 1, 2, 3 and 4 may be combined if no conflict is caused.

The disclosure is described below with reference to exemplary embodiments.

First Embodiment

In a case where the starting point of an occupation time length is the starting point of a subframe in which CCA and/or eCCA are/is implemented successfully, LAA sites appoint that the starting point of an occupation time length is the starting point of a subframe in which CCA and/or eCCA are/is implemented successfully. After occupying an unlicensed carrier, the site may determine, by taking the starting point of the subframe in which the CCA and/or eCCA are/is implemented successfully as the starting point of an occupation time length, an occupation time length which the site needs for loading.

For example, if the site starts implementing CCA and/or eCCA detection in a frame 0 and successfully completes the CCA and/or eCCA in a subframe 1 (that is, the site obtains an unlicensed carrier use right according to a specified rule), then the site may need to determine an occupation time length by taking the starting point of the subframe 1 as the starting point of an occupation time length.

The other sites may receive and analyze an occupation time length signaling sent by the site and determine, according to the description of the signaling, the position of the subframe or OFDM symbol where the occupation time length of the site ends. The other sites may be permitted to implement CCA and/or eCCA to compete for resources after the occupation time length of the site expires.

Second Embodiment

If the starting point of an occupation time length is the moment CCA and/or eCCA are/is completed successfully, LAA sites appoint that the starting point of an occupation time length is the moment CCA and/or eCCA are/is completed successfully. After occupying an unlicensed carrier, the site may determine, by taking the moment CCA and/or eCCA are/is completed successfully as the starting point of an occupation time length, an occupation time length which the site needs for loading.

For example, if the site starts implementing CCA and/or eCCA detection in a frame 0 and successfully completes the CCA and/or eCCA at a time point in a subframe 1 (that is, the site obtains an unlicensed carrier use right according to a specified rule), then the site may need to determine an occupation time length by taking the time point in the subframe 1 as the starting point of an occupation time length.

The other sites may receive and analyze an occupation time length signaling sent by the site and determine, according to the description of the signaling, the position of the subframe or OFDM symbol where the occupation time length of the site ends. The other sites may be permitted to implement CCA and/or eCCA to compete for resources after the occupation time length of the site expires.

Third Embodiment

The design of an occupation time length signaling sent by a site wining a resource contention is divided into two levels.

After successfully occupying resources, the site may determine an occupation time length signaling, generate a corresponding signaling which describes a subframe level and a symbol level, and send the generated signaling.

The meaning of a subframe-level signaling parameter is the description on how many subframes are occupied subsequent to the current subframe (the current subframe is not counted). The occupation time length signaling is sent or received in the current subframe.

The meaning of a symbol-level signaling parameter is the description on how many preceding OFDM symbols in the last subframe described in the subframe-level signaling parameter are occupied.

In the embodiment, when generating an occupation time length signaling, the site occupying the unlicensed carrier may need to guarantee that the maximum time of a single occupation is not longer than a maximum time length specified in a regulation or protocol.

The symbol-level signaling may be optionally sent, if the last subframe occupied by the site is a complete subframe, then the symbol-level signaling may not be sent. Likewise, if there is no symbol-level parameter in the signaling received by another site, then it is considered that the last subframe in the occupation time length is a complete subframe.

Fourth Embodiment

The fourth embodiment directs at a case in which a site has a priority in an occupation time length and resource multiplexing is allowed between the site and other sites.

The site successfully occupying an unlicensed carrier may send an occupation time length signaling which describes an occupation time length declared by the site. The site has a priority in using resources in the occupation time length.

For example, after successfully pre-empting the unlicensed carrier by implementing CCA and/or eCCA, a site 1 may send a declared occupation time length signaling. If the site 1 permits the other sites to use the resources in the declared occupation time length by frequency division multiplexing, then the other sites may need to implement a corresponding CCA and/or eCCA detection on a frequency resource the other sites plan to use so as to gain a use right, then the other sites can use the resources after obtaining the use right.

If the site 1 permits the other sites to use the resources in the declared occupation time length by time division multiplexing, the other sites may need to implement CCA and/or eCCA to occupy the resources of the unlicensed carrier. Moreover, the other sites cannot use the resources of the unlicensed carrier unless the other sites successfully complete CCA and/or eCCA in each scheduling unit or subframe. For example, the other sites only need to implement a single CCA.

If the site 1 permits the other sites to use the resources in the declared occupation time length by code division and spatial division multiplexing, then the other sites may use the resources directly or use the resources after implementing a necessary CCA and/or eCCA. The necessary CCA and/or eCCA refers to CCA and/or eCCA that is implemented by the other sites which take a detected busy channel as an idle channel in a case where the channel is in a busy state because of the signal sending of the site 1.

The foregoing embodiments may realize the occupation of an unlicensed carrier in an LTE system while utilizing the physical channel signaling to the greatest extent, thus minimizing the effect caused to the LTE system.

It should be noted that each of the foregoing modules can be embodied as a piece of software or hardware. In the latter case, each module may be realized in the following way but not limited to the following way: the modules may be located in the same processor, or the modules may be located in a plurality of processors.

A memory medium is also provided in an embodiment of the disclosure. In an exemplary embodiment, the memory medium may be configured to store program codes for executing the following acts.

At act S1, a site may implement CCA and/or eCCA.

At act S2, the site may occupy the unlicensed carrier based on the predetermined granularity, and/or occupy an unlicensed carrier based on a declared time length.

In an exemplary embodiment, the memory medium provided in the embodiment may include, but is not limited to be: a USB flash disk, a Read-Only Memory (ROM), a Random Access Memory (RAM), a mobile hard disk drive, a diskette, an optical disc or another medium on which program codes can be stored.

In an exemplary embodiment, specific examples described in the embodiment can be understood with reference to those described in the foregoing embodiments and the foregoing exemplary embodiments and are therefore not repeated here.

Apparently, it should be appreciated by those skilled in the art that each module or act described in the disclosure can be realized by a universal computer and that the modules or acts may be integrated on a single computer or distributed on a network consisting of a plurality of computers, optionally, the modules or acts may be realized by executable program codes so that the modules or acts can be stored in a memory to be executed by a computer. In some cases, the acts shown or described herein can be executed in a sequence different from this presented herein, or the modules or acts are formed into integrated circuit modules, or several of the modules or acts are formed into integrated circuit modules. Therefore, the disclosure is not limited to the combination of specific hardware and software.

Although certain exemplary embodiments of the disclosure have been described above, it should be appreciated that the exemplary embodiments are not described for limiting the disclosure and that a variety of modifications and variations can be devised by those of ordinary skill in the art. Any modification, equivalent substitute and improvement that can be devised by those of ordinary skill in the art without departing from the principle of the disclosure shall fall within the protection scope of the disclosure.

INDUSTRIAL APPLICABILITY

The foregoing technical solutions may realize the occupation of an unlicensed carrier.

What is claimed is:

1. An unlicensed carrier processing method comprising:
   implementing, by a site, a Clear Channel Assessment (CCA) and/or evolved Clear Channel Assessment (eCCA); and
   occupying, by the site, an unlicensed carrier based on a predetermined granularity, and/or occupying, by the site, an unlicensed carrier based on a declared time length;
   further comprising:
   after occupying, by the site, the unlicensed carrier based on the predetermined granularity, and/or occupying, by the site, the unlicensed carrier based on the declared time length,
   notifying, by the site, other sites of an occupation time length signaling comprising an occupied time length of the unlicensed carrier;
   wherein the site notifies the other sites of the occupation time length signaling in at least one of the following ways:
   the site sends the occupation time length signaling using a subframe in which the CCA and/or eCCA are/is implemented successfully;
   the site sends the occupation time length signaling using a scheduling unit in which the CCA and/or eCCA are/is implemented successfully;
   the site sends the occupation time length signaling using, as specified in advance, a subframe following a subframe in which the CCA and/or eCCA are/is implemented successfully;
   the site sends the occupation time length signaling using, as specified in advance, a scheduling unit following a scheduling unit in which the CCA and/or eCCA are/is implemented successfully;
   the site sends the occupation time length signaling using each subframe comprised in the time length of the unlicensed carrier; and
   the site sends the occupation time length signaling using each scheduling unit comprised in the time length of the unlicensed carrier, wherein sending, by the site, the occupation time length signaling using each subframe comprised in the time length of the unlicensed carrier comprises: sending, by the site with assistance of a (Radio Network Temporary Identity (RNTI), the occupation time length signaling at a specified resource position in each subframe.

2. The method as claimed in claim 1, wherein the site occupies the unlicensed carrier based on the predetermined granularity in at least one of the following ways:
   the site occupies the unlicensed carrier by using subframe as granularity; and
   the site occupies the unlicensed carrier by using scheduling unit as granularity, wherein the scheduling unit comprises at least one of: a time slot of Long Term Evolution (LTE), and one or more Orthogonal Frequency Division Multiplexing (OFDM) symbols.

3. The method as claimed in claim 1, further comprising: when the site occupies the unlicensed carrier, determining, by the site, a time length of the unlicensed carrier which the site needs to occupy.

4. The method as claimed in claim 3, wherein determining, by the site, the time length of the unlicensed carrier which the site needs to occupy comprises at least one of the following acts:
   if a last subframe among subframes in the time length of the unlicensed carrier is an incomplete subframe, determining, by the site, to delete the last subframe in the time length of the unlicensed carrier, or determining, by the site, not to use the last subframe in the time length of the unlicensed carrier;
   all subframes, except a first subframe which is allowed to be an incomplete subframe, in the time length of the unlicensed carrier are complete subframes;
   if a last scheduling unit among scheduling units in the time length of the unlicensed carrier is an incomplete scheduling unit, determining, by the site, to delete the last scheduling unit in the time length of the unlicensed carrier, or determining, by the site, not to use the last scheduling unit in the time length of the unlicensed carrier;
   all scheduling units, except a first scheduling unit which is allowed to be an incomplete scheduling unit, in the time length of the unlicensed carrier are complete scheduling units;
   in a case where a last subframe among subframes in the time length of the unlicensed carrier is an incomplete subframe, if a total time length of the last subframe is comprised in the time length of the unlicensed carrier, and the time length of the unlicensed carrier is not beyond a maximum time length specified in a regulation or protocol, then determining, by the site, to occupy and use a time length of all the subframes comprising the total time length of the last subframe; and
   in a case where a last scheduling unit among scheduling units in the time length of the unlicensed carrier is an incomplete subframe, if a total time length of the last scheduling unit is comprised in the time length of the unlicensed carrier, and the time length of the unlicensed carrier is not beyond a maximum time length specified in a regulation or protocol, then determining, by the site, to occupy and use a time length of all the scheduling units comprising the total time length of the last scheduling unit.

5. The method as claimed in claim 4, wherein when the site determines to delete or determines not to use the last subframe in the time length of the unlicensed carrier, and/or when the site determines to delete or determines not to use the last scheduling unit in the time length of the unlicensed carrier, implementing the CCA and/or eCCA comprises at least one of:
   implementing, by the site or another site, the CCA and/or eCCA in the last subframe and/or the last scheduling unit; and
   implementing, by a site authorized by the site, the CCA and/or eCCA in the last subframe and/or the last scheduling unit;
   or,
   when the site determines to delete or determines not to use the last subframe in the time length of the unlicensed carrier, and/or when the site determines to delete or determines not to use the last scheduling unit in the time length of the unlicensed carrier, the site rejects to send data using the last subframe and/or the last scheduling unit.

6. The method as claimed in claim 3, wherein time length parameters of the time length of the unlicensed carrier which the site needs to occupy comprise at least one of:

subframes which the site occupies successively from a subframe in which the CCA and/or eCCA are/is implemented successfully, wherein the subframe in which the CCA and/or eCCA are/is implemented successfully is or is not comprised in the time length of the unlicensed carrier;

scheduling units which the site occupies successively from a scheduling unit in which CCA and/or eCCA are/is implemented successfully, wherein the scheduling unit in which the CCA and/or eCCA are/is implemented successfully is or is not comprised in the time length of the unlicensed carrier;

OFDM symbols which the site occupies from an OFDM symbol in which CCA and/or eCCA are/is implemented successfully;

rest subframes which the site determines to occupy relative to a current subframe;

rest scheduling units which the site determines to occupy relative to a current scheduling unit;

rest OFDM symbols which the site determines to occupy relative to a current OFDM symbol;

a subframe number of a last subframe in the time length of the unlicensed carrier, which the site determines to occupy, relative to a current subframe; and a serial number of a last scheduling unit in the time length of the unlicensed carrier, which the site determines to occupy, relative to a current scheduling unit.

7. The method as claimed in claim 6, further comprising at least one of:

in a case where the time length parameters comprise the subframes which the site occupies successively from the subframe in which the CCA and/or eCCA are/is implemented successfully, the time length parameters further comprise OFDM symbols occupied in a last subframe of the successively occupied subframes;

in a case where the time length parameters comprise the scheduling units which the site occupies successively from the scheduling unit in which the CCA and/or eCCA are/is implemented successfully, the time length parameters further comprise OFDM symbols occupied in a last scheduled unit of the successively occupied scheduling unit;

in a case where the time length parameters comprise the rest subframes which the site determines to occupy relative to the current subframe, the time length parameters further comprise OFDM symbols occupied in a last subframe of the rest subframes which the site needs to occupy;

in a case where the time length parameters comprise the rest scheduling units which the site determines to occupy relative to the current scheduling unit, the time length parameters further comprise OFDM symbols occupied in a last scheduling unit of the rest scheduling units which the site needs to occupy;

in a case where the time length parameters comprise the subframe number of the last subframe in the time length of the unlicensed carrier, which the site determines to occupy, relative to the current subframe, the time length parameters further comprise OFDM symbols occupied in the last subframe; and in a case where a serial number of a last scheduling unit in the time length of the unlicensed carrier, which the site determines to occupy, relative to a current scheduling unit, the time length parameters further comprise OFDM symbols occupied in the last scheduling unit;

or, further comprising: in a case where the subframe and/or the scheduling unit in which the CCA and/or eCCA are/is successfully implemented are/is comprised in the time length, the subframe and/or scheduling unit in which the CCA and/or eCCA are/is successfully implemented are/is wholly counted in the time length of the unlicensed carrier as one subframe and/or scheduling unit; and/or a part of the subframe and/or scheduling unit in which the CCA and/or eCCA are/is successfully implemented, starting from a moment at which the CCA and/or eCCA are/is successfully implemented and ending till an end of the subframe and/or scheduling unit, is counted in the time length of the unlicensed carrier.

8. The method as claimed in claim 3, wherein an end point of the time length of the unlicensed carrier is an end border moment of a predetermined subframe and/or scheduling unit.

9. The method as claimed in claim 1, wherein if the declared time length comprises at least one of: a time quantity, a fixed time length and a preconfigured time length, the declared time length comprises:

one or more subframes or scheduling units corresponding to an actual occupation time length, wherein the actual occupation time length is obtained by subtracting an actual occupation time length of a first subframe or a first scheduling unit of the declared time length from the declared time length to obtain a remaining occupation time length and then rounding up or down a quotient obtained by dividing the remaining occupation time length by a time length of one subframe or one scheduling unit.

10. The method as claimed in claim 9, wherein acquisition of the one or more subframes or scheduling units corresponding to the actual occupation time length comprises at least one of the following operations: if the actual occupation time length obtained after the quotient is rounded up is not beyond a maximum time length specified in a regulation and/or protocol, then the site determines the declared time length through a rounding up operation; and if the actual occupation time length obtained after the quotient is rounded up is beyond a maximum time length specified in a regulation and/or protocol, then the site determines the declared time length through a rounding down operation;

or, the time quantity comprises: a numerical value which represents the time length of the unlicensed carrier and which is comprised by the site in a signaling describing an occupation time length of the unlicensed carrier, wherein the numerical value is a time quantity taking time unit as dimension;

or, the fixed time length comprises a declared time length specified in a regulation and/or protocol for the site to occupy an unlicensed carrier each time;

or,
the preconfigured time length comprises a semi-statically configured time length and/or a dynamically configured time length.

11. The method as claimed in claim 1, further comprising at least one of:
when the site occupies the unlicensed carrier, the site has a priority in using the unlicensed carrier; and
when the site occupies the unlicensed carrier, the site is able to authorize another site to use the unlicensed carrier, wherein the other site desiring to use the unlicensed carrier implements CCA and/or eCCA in the time length of the occupied unlicensed carrier so as to gain a right to use the unlicensed carrier;
wherein the CCA and/or eCCA implemented by the other site in the time length of the occupied unlicensed carrier are/is a high-priority CCA and/or eCCA with a pre-emption possibility higher than a pre-emption possibility for the CCA and/or eCCA implemented by the site for preempting the unlicensed carrier.

12. The method as claimed in claim 11, wherein
the right obtained by the other site for using the unlicensed carrier is effective in a period the site occupies the unlicensed carrier; he right being effective in the period the site occupies the unlicensed carrier comprises the following cases: the right is effective in one or more subframes in the time length of the unlicensed carrier occupied by the site; or the right is effective in one or more scheduling units in the time length of the unlicensed carrier occupied by the site;
or,
further comprising: when the site occupies the unlicensed carrier and subframes and/or scheduling units not used by the site are occupied by the other site, if the site needs to use the subframes and/or scheduling units, directly using, by the site, the subframes and/or scheduling units without implementing the CCA and/or eCCA.

13. The method as claimed in claim 1, wherein implementing, by the site, the CCA and/or eCCA comprises: implementing, by the site, the CCA and/or eCCA in former preset number of OFDM symbols in a subframe for implementing the CCA and/or eCCA.

14. The method as claimed in claim 1, further comprising:
when the site occupies the unlicensed carrier, permitting, by the site, another site to use resources on the unlicensed carrier by multiplexing, or permitting, by the site, another site to use resources on the unlicensed resource exclusively, wherein the multiplexing comprises at least one of: frequency division multiplexing, time division multiplexing, spatial division multiplexing and code division multiplexing, and when the other site uses the resources on the unlicensed carrier by multiplexing, the other site needs to implement CCA and/or eCCA first and then use the resources by multiplexing after implementing the CCA and/or eCCA successfully,
wherein implementing, by the other site, the CCA and/or eCCA comprises: implementing, by the other site, the CCA and/or eCCA according to a specified frequency resource pattern, wherein the specified frequency resource pattern comprises at least one of: specified Physical Resource Blocks (PRBs), specified Resource Elements (REs), and specified sub-carriers.

15. The method as claimed in claim 1, further comprising:
after the site implements the CCA and/or eCCA, determining, by the site, at least one of the following frequency domain resources:
frequency domain resources of a Physical Resource Block (PRB) without signal energy;
frequency domain resources of a Resource Element (RE) without signal energy; and
frequency domain resources of a sub-carrier without signal energy;
further comprising:
after determining, by the site, the frequency domain resources, determining attributes of the site occupying the unlicensed carrier according to a pattern of the frequency domain resources without signal energy, wherein the attributes of the site comprise at least one of: information of an operator to which the site belongs, and information on whether or not the site supports frequency reusing and/or multiplexing.

16. The method as claimed in claim 1, further comprising:
after implementing, by the site, the CCA and/or eCCA, determining, by the site, at least one of the following frequency domain resources:
frequency domain resources of a PRB with signal energy;
frequency domain resources of an RE with signal energy;
frequency domain resources of a sub-carrier with signal energy;
further comprising:
after determining, by the site, the frequency domain resources, determining attributes of the site occupying the unlicensed carrier according to a pattern of the frequency domain resources with signal energy, wherein the attributes of the site comprise at least one of: information of an operator to which the site belongs, and information on whether or not the site supports frequency reusing and/or multiplexing.

17. An unlicensed carrier processing method comprising:
implementing, by a site, a Clear Channel Assessment (CCA) and/or evolved Clear Channel Assessment (eCCA);
occupying, by the site, an unlicensed carrier based on a predetermined granularity;
configuring, by the site, a signaling according to a time length of the unlicensed carrier which the site occupies and sending, by the site, the signaling,
wherein the signaling comprises: description on Orthogonal Frequency Division Multiplexing (OFDM) symbols occupied in a last subframe in the time length of the unlicensed carrier which the site occupies;
sending, by the site, the signaling comprises:
sending, by the site with assistance of a Radio Network Temporary Identity (RNTI), the signaling at a specified resource position in a subframe.

18. The method as claimed in claim 17, wherein the site occupies the unlicensed carrier based on the predetermined granularity in at least one of the following ways:
the site occupies the unlicensed carrier by using subframe as granularity;
the site occupies the unlicensed carrier by using scheduling unit as granularity, wherein the scheduling unit comprises at least one of: a time slot of Long Term Evolution (LTE), and one or more OFDM symbols.

19. The method as claimed in claim 17, wherein sending, by the site, the signaling comprises:
sending, by the site, the signaling using one or more subframes in the time length of the unlicensed carrier; and/or sending, by the site, the signaling in each subframe comprised in the time length of the unlicensed carrier.

20. The method as claimed in claim 19, wherein sending, by the site with assistance of the RNTI, the signaling at the specified resource position in the subframe comprises:

sending, by the site with assistance of the RNTI, the signaling at the specified resource position in the subframe in the time length of the unlicensed carrier.

21. The method as claimed in claim 20, wherein sending, by the site, the signaling comprises:

using, by the site, a common search space of a Physical Downlink Control Channel (PDCCH) or an enhanced (PDCCH) to send the signaling in a subframe in the time length of the unlicensed carrier.

22. The method as claimed in claim 17, further comprising:

if a last subframe among subframes in the time length of the unlicensed carrier is a complete subframe, the signaling describes occupation of all OFDM symbols of the last subframe;

or, if subframes in the time length of the unlicensed carrier comprise uplink subframes and downlink subframes, subframes occupied by the site comprise either or both of the downlink subframes and the uplink subframes;

or, if a last subframe among subframes in the time length of the unlicensed carrier is an incomplete subframe, the signaling describes OFDM symbols occupied in the last subframe.

23. An unlicensed carrier processing method comprising:

receiving and analyzing a signaling, which is sent by a site, for indicating a time length in which an unlicensed carrier is occupied; and determining Orthogonal Frequency Division Multiplexing (OFDM) symbols occupied in a last subframe in the time length according to the analyzed signaling, wherein the signaling comprises: description on the OFDM symbols occupied in the last subframe in the time length of the unlicensed carrier which the site occupies;

receiving the signaling comprises:

receiving the signaling, which is sent, with assistance of a Radio Network Temporary Identity (RNTI), by the site at a specified resource position in a subframe.

24. An unlicensed carrier processing apparatus applied to a site, the apparatus comprising:

an implementation module, configured to implement a Clear Channel Assessment (CCA) and/or evolved Clear Channel Assessment (eCCA);

a carrier occupation module, configured to occupy an unlicensed carrier based on a predetermined granularity; and a sending module, configured to configure a signaling according to a time length of the unlicensed carrier which the site occupies and send the signaling, wherein the signaling comprises: a description on Orthogonal Frequency Division Multiplexing (OFDM) symbols occupied in a last subframe in the time length of the unlicensed carrier, which the site occupies;

the sending module is configured to send, with assistance of a Radio Network Temporary Identity (RNTI), the signaling at a specified resource position in a subframe.

25. An unlicensed carrier processing apparatus comprising:

a receiving module, configured to receive and analyze a signaling, which is sent by a site, for indicating a time length in which an unlicensed carrier is occupied; and a determination module, configured to determine Orthogonal Frequency Division Multiplexing (OFDM) symbols occupied in a last subframe in the time length according to the analyzed signaling, wherein the signaling comprises: a description on the OFDM symbols occupied in the last subframe in the time length of the unlicensed carrier which the site occupies;

the receiving module is configured to receive the signaling, which is sent, with assistance of a Radio Network Temporary Identity (RNTI), by the site at a specified resource position in a subframe.

* * * * *